(12) United States Patent
Hadden et al.

(10) Patent No.: US 12,542,790 B2
(45) Date of Patent: Feb. 3, 2026

(54) ACTION RESPONSE FRAMEWORK FOR DATA SECURITY INCIDENTS

(71) Applicant: Workday, Inc., Pleasanton, CA (US)

(72) Inventors: Allen Hadden, Marlborough, MA (US); Kenneth Allen Rogers, Stow, MA (US)

(73) Assignee: Workday, Inc., Pleasanton, CA (US)

( * ) Notice: Subject to any disclaimer, the term of this patent is extended or adjusted under 35 U.S.C. 154(b) by 45 days.

(21) Appl. No.: 17/874,798

(22) Filed: Jul. 27, 2022

(65) Prior Publication Data

US 2022/0385679 A1 Dec. 1, 2022

Related U.S. Application Data

(63) Continuation of application No. 16/525,690, filed on Jul. 30, 2019, now Pat. No. 11,463,456, which is a
(Continued)

(51) Int. Cl.
*H04L 9/40* (2022.01)
*G06F 3/0482* (2013.01)
*G06F 3/04842* (2022.01)

(52) U.S. Cl.
CPC ........ *H04L 63/1416* (2013.01); *G06F 3/0482* (2013.01); *G06F 3/04842* (2013.01);
(Continued)

(58) Field of Classification Search
CPC ............. H04L 63/1416; H04L 63/1408; H04L 63/1433; H04L 63/1441; H04L 63/20; G06F 3/0482; G06F 3/04842
See application file for complete search history.

(56) References Cited

U.S. PATENT DOCUMENTS 6,125,408 A 9/2000 McGee
6,378,607 B1 4/2002 Ryan
(Continued)

FOREIGN PATENT DOCUMENTS

WO 2004104793 12/2004

OTHER PUBLICATIONS

QRadar Users Guide, http://www.q1labs.com, May 2012. 396 pages.
(Continued)

*Primary Examiner* — Jimmy H Tran
(74) *Attorney, Agent, or Firm* — Cooper Legal Group, LLC

(57) ABSTRACT

An incident manager application (IM) for responding to data security incidents in enterprise networks is disclosed. An IM tracks the incidents in an enterprise network by storing incident objects and incident artifact (IA) metadata created for the incidents, where the incident objects and IAs include information concerning the incidents. Incident response team (IRT) personnel of the enterprise networks can define action conditions within the IM that are associated with the incident objects. When the information within the incident objects and/or IAs meets the defined action conditions, the IM includes the objects that cause the action conditions to be satisfied in messages. Devices such as user account databases and configuration servers within the enterprise network can then download the messages and execute actions that reference the objects extracted from the downloaded messages to implement a response to the incidents.

20 Claims, 27 Drawing Sheets

Related U.S. Application Data continuation of application No. 14/792,129, filed on Jul. 6, 2015, now Pat. No. 10,367,828.

(60) Provisional application No. 62/072,829, filed on Oct. 30, 2014.

(52) U.S. Cl.
CPC ...... *H04L 63/1408* (2013.01); *H04L 63/1433* (2013.01); *H04L 63/1441* (2013.01); *H04L 63/20* (2013.01)

(56) References Cited

U.S. PATENT DOCUMENTS

| | | | |
|---|---|---|---|
| 6,678,827 B1 | 1/2004 | Rothermel | |
| 7,013,395 B1 | 3/2006 | Swiler | |
| 7,376,969 B1 | 5/2008 | Njemanze | |
| 7,472,422 B1* | 12/2008 | Agbabian | H04L 41/06 726/25 |
| 7,873,717 B1 | 1/2011 | Woolway | |
| 7,877,804 B2 | 1/2011 | Khanolkar | |
| 7,996,374 B1* | 8/2011 | Jones | H04L 63/20 707/694 |
| 8,032,557 B1 | 10/2011 | Sudhir | |
| 8,056,130 B1* | 11/2011 | Njemanze | H04L 63/1425 709/224 |
| 8,141,157 B2 | 3/2012 | Farley | |
| 8,176,561 B1* | 5/2012 | Hurst | H04L 63/1433 726/1 |
| 8,225,407 B1* | 7/2012 | Thrower | H04L 63/1441 726/25 |
| 8,244,777 B1 | 8/2012 | Sudhir | |
| 8,365,278 B1* | 1/2013 | Njemanze | H04L 63/1416 726/22 |
| 8,661,062 B1 | 2/2014 | Jamail | |
| 8,707,445 B2 | 4/2014 | Sher-Jan | |
| 8,763,133 B2 | 6/2014 | Sher-Jan | |
| 8,782,784 B1 | 7/2014 | Bruskin | |
| 8,880,682 B2 | 11/2014 | Bishop | |
| 9,002,384 B1* | 4/2015 | Hallenbeck | H04W 4/02 455/457 |
| 9,069,930 B1 | 6/2015 | Hart | |
| 9,075,668 B1 | 7/2015 | Hushon | |
| 9,083,734 B1 | 7/2015 | Bishop | |
| 9,152,706 B1 | 10/2015 | Claudatos | |
| 9,215,270 B2 | 12/2015 | Mohaban | |
| 9,258,321 B2 | 2/2016 | Amsler | |
| 11,030,579 B1* | 6/2021 | Campbell | G06Q 10/10 |
| 11,997,129 B1* | 5/2024 | Aloisio | H04L 41/142 |
| 2002/0169644 A1* | 11/2002 | Greene | H04L 67/535 705/7.18 |
| 2003/0023476 A1* | 1/2003 | Gainey | G06Q 10/10 705/7.42 |
| 2003/0105976 A1* | 6/2003 | Copeland, III | G06F 21/552 709/224 |
| 2004/0267729 A1* | 12/2004 | Swaminathan | G06F 16/26 |
| 2005/0039144 A1* | 2/2005 | Wada | G06F 16/957 715/779 |
| 2005/0182722 A1* | 8/2005 | Meyer | G06Q 30/02 705/40 |
| 2005/0193269 A1* | 9/2005 | Haswell | G06F 11/3684 714/E11.208 |
| 2005/0245232 A1* | 11/2005 | Jakober | G08B 27/005 455/410 |
| 2006/0031938 A1 | 2/2006 | Choi | |
| 2006/0101517 A1 | 5/2006 | Banzhof | |
| 2006/0211404 A1* | 9/2006 | Cromp | H04L 67/1095 250/559.48 |
| 2007/0103294 A1* | 5/2007 | Bonecutter | G08B 25/10 340/539.18 |
| 2007/0164849 A1* | 7/2007 | Haeberle | G06Q 10/06 340/7.23 |
| 2007/0180107 A1* | 8/2007 | Newton | H04L 63/1425 709/224 |
| 2008/0016569 A1* | 1/2008 | Hammer | G06F 21/554 726/23 |
| 2008/0040191 A1* | 2/2008 | Chakravarty | G06Q 10/10 705/7.26 |
| 2008/0133300 A1* | 6/2008 | Jalinous | G06Q 10/0637 705/7.29 |
| 2009/0063234 A1* | 3/2009 | Refsland | G06Q 10/06 705/7.15 |
| 2009/0103524 A1* | 4/2009 | Mantripragada | H04L 65/1079 370/352 |
| 2009/0199120 A1* | 8/2009 | Baxter | G06F 3/0482 715/764 |
| 2009/0200021 A1 | 8/2009 | Pinto | |
| 2009/0217381 A1* | 8/2009 | Helman | G06F 21/577 726/25 |
| 2009/0254392 A1* | 10/2009 | Zander | H04L 63/20 705/50 |
| 2009/0271504 A1 | 10/2009 | Ginter | |
| 2009/0328222 A1* | 12/2009 | Helman | G06F 21/554 726/25 |
| 2010/0131533 A1 | 5/2010 | Ortiz | |
| 2010/0242106 A1 | 9/2010 | Harris | |
| 2010/0306179 A1* | 12/2010 | Lim | G06F 11/3006 707/688 |
| 2011/0106558 A1 | 5/2011 | Solito | |
| 2011/0145711 A1* | 6/2011 | Njemanze | G06F 21/552 709/224 |
| 2012/0131185 A1 | 5/2012 | Petersen | |
| 2012/0205154 A1 | 8/2012 | Lozinsky | |
| 2012/0232947 A1* | 9/2012 | McLachlan | G06F 16/289 705/7.23 |
| 2012/0324377 A1* | 12/2012 | Allington | G06F 8/38 715/763 |
| 2013/0055399 A1* | 2/2013 | Zaitsev | H04L 63/0263 726/25 |
| 2013/0091574 A1 | 4/2013 | Howes | |
| 2013/0124223 A1 | 5/2013 | Gregg | |
| 2013/0179936 A1* | 7/2013 | Choi | G06F 21/57 726/1 |
| 2013/0246925 A1* | 9/2013 | Ahuja | H04L 63/20 709/224 |
| 2013/0297364 A1* | 11/2013 | Putra | G06Q 10/103 705/7.14 |
| 2013/0329522 A1 | 12/2013 | Skinner | |
| 2013/0332590 A1 | 12/2013 | Mohaban | |
| 2013/0346440 A1* | 12/2013 | Alon | G06F 16/9537 707/769 |
| 2014/0058730 A1* | 2/2014 | Costa | H04W 4/90 704/235 |
| 2014/0089039 A1* | 3/2014 | McClellan | G06Q 10/0635 705/7.28 |
| 2014/0208843 A1 | 7/2014 | Godfrey | |
| 2014/0259170 A1* | 9/2014 | Amsler | H04L 63/1408 726/23 |
| 2014/0278664 A1* | 9/2014 | Loomis | G05B 23/0272 705/7.17 |
| 2014/0304822 A1 | 10/2014 | Sher-Jan | |
| 2015/0033351 A1* | 1/2015 | Oliphant | G06F 21/554 726/25 |
| 2015/0113663 A1 | 4/2015 | Sher-Jan | |
| 2015/0143504 A1* | 5/2015 | Desai | H04L 63/0245 709/224 |
| 2015/0180891 A1* | 6/2015 | Seward | H04L 63/1416 726/22 |
| 2015/0235164 A1 | 8/2015 | Key | |
| 2015/0242625 A1 | 8/2015 | Cassidy | |
| 2015/0244732 A1* | 8/2015 | Golshan | H04L 63/145 726/24 |
| 2015/0312266 A1* | 10/2015 | Thomas | H04L 65/1033 726/24 |
| 2015/0312267 A1* | 10/2015 | Thomas | H04L 63/0227 726/1 |
| 2015/0356301 A1 | 12/2015 | Diehl | |
| 2016/0021133 A1 | 1/2016 | Sher-Jan | |
| 2016/0028771 A1 | 1/2016 | Jacobsen | |

(56) References Cited

U.S. PATENT DOCUMENTS

| | | | |
|---|---|---|---|
| 2016/0036837 A1 | 2/2016 | Jain | |
| 2016/0072836 A1* | 3/2016 | Hadden | H04L 63/1416 726/23 |
| 2016/0119379 A1* | 4/2016 | Nadkarni | H04L 63/0263 726/1 |
| 2016/0164890 A1* | 6/2016 | Haugsnes | G06F 16/951 726/23 |
| 2016/0192166 A1* | 6/2016 | deCharms | H04N 7/148 348/14.02 |
| 2016/0205142 A1* | 7/2016 | Arkin | H04L 67/52 726/1 |
| 2016/0308910 A1* | 10/2016 | Carver | H04L 63/1416 |
| 2016/0321452 A1* | 11/2016 | Richardson | H04W 12/12 |
| 2016/0373469 A1* | 12/2016 | Howard | H04L 63/145 |
| 2017/0048273 A1* | 2/2017 | Bach | H04L 51/212 |
| 2017/0070480 A1* | 3/2017 | Blumenfeld | H04L 9/0618 |
| 2017/0230412 A1* | 8/2017 | Thomas | H04L 63/1416 |
| 2020/0304999 A1* | 9/2020 | Hernoud | G06F 21/84 |

OTHER PUBLICATIONS

BlackStratus SIEMStorm, "Rapidly identify and resolve threats, . . . " www.blackstratus.com, 2012. Four pages.

D. Swift, "A Practical Application of SIM/SEM/SIEM Automating Threat Identification," 2006, SANS Institute 2007. Forty-one pages.

Domino Project Management, "Track and Control Projects with Lotus Notes," www.trackersuite.com/index, 2013. Two pages.

HP ArcSight Express, "World-Class Protection for the Mid-Size Organization," www.arcsight.com, 2010. Six pages.

J. Jarocki, "Orion Incident Response Live CD," 2010, Sans Institute, https://www.sans.org. Forty-five pages.

Janet Csirt, "RTIR incident handling work-flow," Janet (UK) WI/JCSIRT/002, jisc.ac.uk, 2011. Eighteen pages.

Khurana et al., "Palantir: A Framework for Collaborative Incident Response and Investigation," IDtrust, 2009. Fourteen pages.

M. West-Brown et al., "Handbook for Computer Security Incident Response Teams (CSIRTs)," 2nd Edition, Apr. 2003. 223 pages.

PCT/US15/48469 International Search Report and Written Opinion of the International Searching Authority, mailed Nov. 27, 2015.

QRadar Administration Guide, http://www.q1labs.com, May 2012. 318 pages.

Reddy et al., "The architecture of a digital forensic readiness management system," Computers & Security 32 (2013) 73-89. Seventeen pages.

* cited by examiner

| Co3Systems Dashboards ▼ | List Incidents | New Incident | My Tasks | Simulations | Search | 🌐 Co3 Admin ▶ Re |

650 →

330 nb

Summary                                     Close Incident ↗▶

Notify E-team     326

| ID | 2108 |
| Phase | Engage |
| Severity | Low |
| Created | 09/24/2014 |
| Discovered | 09/24/2014 |
| Data Compromised | Unknown |

Description
No description

| Tasks | Details | Breach | Nodes | Members | News Feed | Attachments | Stats | Timeline | Analytics |

Add Task                                                                           Edit Filter By  ☑ Open  ☑ Closed  ☐ Inactive Category Subcategory              Due Date        Flag       Owner ■ Data Breach. Organizational

☐ Investigate exposure of PI

People

Created By  Co3 Admin

ACTION RESPONSE FRAMEWORK FOR DATA SECURITY INCIDENTS

RELATED APPLICATIONS

This application is a continuation of U.S. patent application Ser. No. 16/525,690 entitled ACTION RESPONSE FRAMEWORK FOR DATA SECURITY INCIDENTS filed Jul. 30, 2019 which is incorporated herein by reference for all purposes, which is a continuation of U.S. patent application Ser. No. 14/792,129 entitled ACTION RESPONSE FRAMEWORK FOR DATA SECURITY INCIDENTS, now U.S. Pat. No. 10,367,828, filed Jul. 6, 2015 which is incorporated herein by reference for all purposes, which claims priority to U.S. Provisional Application No. 62/072,829 entitled ACTION RESPONSE FRAMEWORK FOR DATA SECURITY INCIDENTS filed on Oct. 30, 2014, which is incorporated herein by reference for all purposes.

BACKGROUND OF THE INVENTION

A data security incident is a general term associated with many different types of unauthorized activity involving devices and/or sensitive data. The unauthorized activity typically occurs on an enterprise network. Examples of devices include computing devices such as desktops, laptops, mobile phones, other mobile computing devices, application servers, authentication servers and networking devices such as routers and firewalls. Examples of data security incidents include lost or stolen computing devices, devices compromised by malware or accessed without authorization, and internet based cyber attacks.

Data security incidents pose a major operational and financial risk for business. Data security incidents such as cyber attacks are often designed to disrupt normal business operations and to steal information. Attacks that disrupt business operations include introduction of malware, computer viruses, and Denial of Service (DoS) attacks. The intrusion attempts use various methods to gain unauthorized access to personal information of individuals, and company confidential information such as customer lists and business plans. Attackers use methods that target security vulnerabilities in computer operating systems and software within the business' enterprise network to obtain unauthorized access.

Businesses use incident management systems to track and recommend responses to data security incidents in their enterprise computer networks. Current incident management systems and methods typically provide the ability for Incident Response Team (IRT) personnel to track how the institution is responding to incidents.

SUMMARY OF THE INVENTION

Often, systems and devices within the enterprise network typically must wait for IRT members to manually carry out the responses to incidents. IRT members typically create tasks in response to incidents and then carry out the tasks. This can create delay when responding to incidents. This delay can significantly impact the efficiency of responses to incidents. Secondly, the incident responses provided by these systems do not scale with an increasing number of subnetworks and devices in each client's enterprise networks.

Also, manual creation of tasks and their manual execution by IRT personnel is error prone and can cause delay when responding to incidents. In particular, data security incidents involving malware such as viruses, worms, trojans, and bots are often self-replicating. As a result, any delays incurred when responding to malware incidents can increase the cost and effort to assess and eliminate the threat and to remediate any damage caused by the threat.

The present invention provides a client/server based action response framework included within an Incident Manager (IM) application. The IM tracks the data security incidents for enterprise networks of clients and stores information concerning the data security incidents within the IM. The information concerning the data security incidents can include incident data of the data security incidents and any metadata associated with each incident. In one example, the incident data includes data traffic traces and/or compromised ports of an incident, and metadata of the incident includes source and destination IP addresses in the data traffic traces. In another example, the incident data includes the contents of email "phishing" messages, and metadata of the incident includes hashes for malware files and suspect domain names in the messages.

The IM preferably stores the information concerning the data security incidents within objects. In examples, the objects include incident objects, notes objects, and incident artifact objects, also known as incident artifacts (IAs). The incident objects typically include the details of data security incidents (e.g. the incident data). The IAs store information about the incidents such as data resources identified within the incident objects. In examples, the IM can create the objects automatically in response to incidents, or IRT personnel can create the objects.

Data resources can include information such as IP addresses, domain names, identities of known hackers, and hashes associated with files, in examples. Each IAs is a child object of one or more incident objects. In one example, IRT personnel can create the IAs manually in response to identifying the data resources within the incident objects. In another example, the IM can create the IAs automatically manually in response to identifying the data resources within the incident objects.

Action conditions associated with incidents are also defined on the IM. The action conditions describe a set of events and/or behaviors associated with incidents. IRT personnel also configure each action condition to include an identifier/ID of a specific message queue within the IM, also known as a message destination. Each message destination is typically associated with a specific device or resource in the client's enterprise system.

When the information concerning the data security incidents stored in incident objects and/or IAs satisfy an action condition, this event is also known as a satisfied action condition. In response to a satisfied action condition, the IM includes the contents of the associated incident objects and/or IAs (e.g. the information concerning the data security incidents) in a message. In one example, the IM can send the messages directly to devices on the enterprise network. Preferably, the IM sends the messages to the message destinations. Users of the IM such as IRT personnel typically create the message destinations and the action conditions.

The devices, such as a configuration server or other devices include computing devices such as desktops, laptops, mobile phones, other mobile computing devices, application servers, authentication servers and networking devices such as routers and firewalls, within a client's enterprise network can include message interfaces. This enables the devices to be message clients of the message destinations. Such devices are also known as message enabled devices. Preferably, each message enabled device includes one or more action scripts that the IRT personnel configure to access the message destinations within the IM. Preferably, each action script is configured to interface with a specific message destination.

Each action script can then consume the messages located within its associated message destination. Each action script typically consumes the messages by polling its configured message destination for messages and downloading the messages.

The action scripts extract the information concerning the data security incidents from the messages, and execute actions in the actions scripts that reference the information extracted from the messages to implement an incident response. Because the action scripts are decoupled from the action conditions, the IM can provide an incident response capability that can scale with an increasing number of devices within each client's enterprise network.

Preferably, in response to data security incidents, action scripts located within a configuration server device can execute actions on other devices in the enterprise network. In another example, action scripts included within devices can execute actions within the devices themselves. In yet another example, the action scripts can interact with information sources other than the devices, such as databases of known cyber threats.

In general, according to one aspect, the invention features a method for responding to data security incidents in an enterprise network. The method stores, in an incident manager (IM), information concerning the data security incidents, and compares the information concerning the data security incidents to a set of action conditions to determine action conditions that are satisfied by some of the information concerning the data security incidents.

Then, the method provides the information concerning the data security incidents associated with the satisfied action conditions to devices or a configuration server in the enterprise network, and executes actions that reference the information concerning the data security incidents on the devices.

In one example, the method provides the information concerning the data security incidents associated with the satisfied action conditions in the enterprise network by including the information concerning the data security incidents in messages and sending the messages.

Preferably, the method provides the information concerning the data security incidents associated with the satisfied action conditions to the devices and/or a configuration server device in the enterprise network by including the information concerning the data security incidents in messages, sending the messages to message destinations of the IM, and the devices polling the message destinations for the messages and downloading the messages.

The action conditions include manual action conditions and automatic action conditions. In one example, the manual action conditions render a selectable action gesture within a Graphical User Interface (GUI) screen of an IM user application that manages the IM. Typically, a selectable action gesture such as a button is rendered in response to information concerning the data security incidents that satisfy the manual action conditions. Then, in response to the selection of the selectable action gesture, the method preferably includes the information concerning the data security incidents associated with the satisfied manual action conditions in messages and sends the messages to message destinations of the IM. Devices can then poll the message destinations for the messages and download the messages.

In another example, the method provides the information concerning the data security incidents associated with the satisfied action conditions to the devices in the enterprise network through satisfaction of automatic action conditions. Typically, one or more satisfied automatic action conditions include the information concerning the data security incidents associated with the satisfied automatic action conditions in messages, and send the messages to message destinations of the IM. The message destinations are then polled for the messages and the messages downloaded.

In one embodiment, executing the actions that reference the information concerning the data security incidents on the devices comprises the devices including action scripts which in turn include the actions, and executing the actions upon the devices including the action scripts.

In a preferred embodiment, executing the actions that reference the information concerning the data security incidents on the devices comprises a configuration server device including action scripts which in turn include the actions, and executing the actions upon other devices which do not include the action scripts. Typically, the actions include business logic, which in turn reference the information concerning the data security incidents.

Typically, the action scripts update the information concerning the data security incidents stored on the IM via an API of the IM. In one example, the API is a REST API.

The method also comprises creating, modifying, and displaying the set of action conditions via an IM user application that manages the IM.

In general, according to another aspect, the invention features a system for responding to data security incidents in an enterprise network. The system includes devices responsible for security on the enterprise network, and an incident manager (IM). The IM stores information concerning the data security incidents and compares the information concerning the data security incidents to a set of action conditions to determine the action conditions satisfied by the information concerning the data security incidents.

The IM also provides the information concerning the data security incidents associated with the satisfied action conditions to the devices, which then execute actions that reference the information concerning the data security incidents.

In examples, the devices responsible for security on the enterprise network include a helpdesk system, an asset database, a user account database, and/or a configuration server.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 9 shows the List Incidents screen of the IM application, including the GUI manual action button populated in FIG. 8A:

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or devices, but do not preclude the presence or addition of one or more other features, integers, steps, operations, elements, devices, and/or groups thereof. Further, it will be understood that when an element, including device or subsystem, is referred to and/or shown as being connected or coupled to another element, it can be directly connected or coupled to the other element or intervening elements may be present.

Figure 1A:
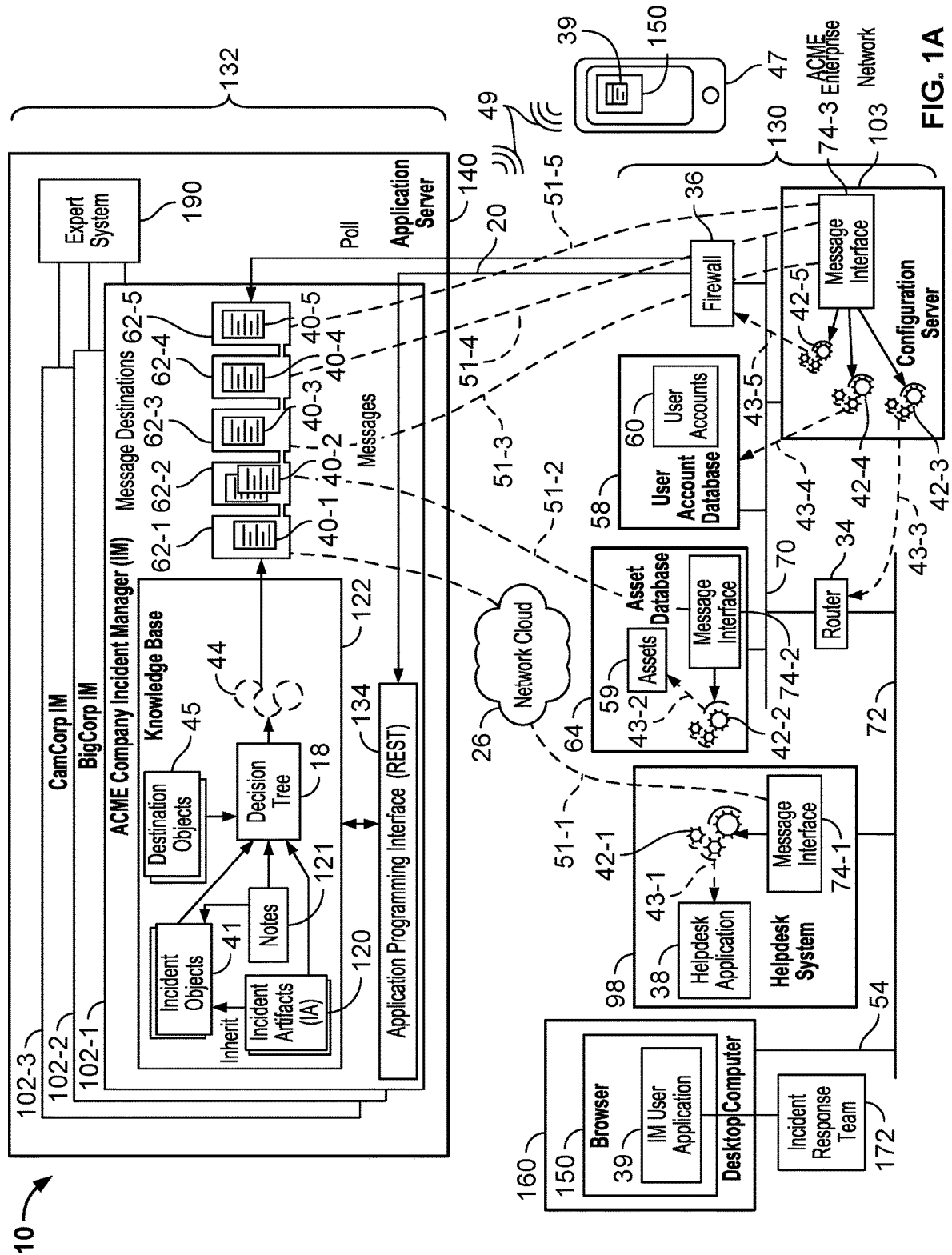
FIG. 1A is a block diagram showing a cloud embodiment of Incident Manager (IM) application including an inventive action response framework, where each IM resides in a service network and manages enterprise networks of business clients.

FIG. 1A shows one embodiment of incident response system 10 that includes one or more Incident Manager applications 102-1 through 102-3. Each Incident Manager (IM) 102 is implemented as a Software as a Service (SaaS) application in one example. The IMs 102 typically are hosted on an application server 140. The application server 140 is included, within a service network 132.

Typically, a separate IM 102 manages each client enterprise network 130. In one example, an expert system 190 included within the application server 140 sends management information 54 to the application server 140 to create and maintain information across the IMs 102. Only the enterprise network 130 of client ACME is shown.

Separate Incident Managers 102-1 through 102-3 manage the enterprise networks 130 of exemplary clients ACME Company, BigCorp, and CamCorp, respectively. The enterprise network 130 for ACME Company is included to show interactions between devices in ACME's enterprise network 130 and its IM 102-1. The enterprise network 130 includes exemplary devices and systems that communicate over a corporate network 70 and among one or more subnetwork % 72. The subnetworks 72 are segmented from the corporate network 70 via a router 34. A firewall 36 is also included on ACME's corporate network 70. Other devices within ACME's enterprise network 130 include a desktop computer 160, a helpdesk system 98, an asset database 64, a user account database 58, and a configuration server 103.

The Helpdesk System 98 includes a Helpdesk Application 38 that logs events and supports creation of tickets for identifying issues in the enterprise network 130. The helpdesk system 98 also includes message interface 74-1 and action script 42-1. Asset database 64 stores and maintains assets 59 such as IP addresses of users on ACME's enterprise network 130. Asset database 64 also includes message interface 74-2 and action script 42-2. Both the desktop computer 160 and the mobile phone 47 include an IM User Application 39 that runs within browser 150. User account database 58 includes user accounts 60. Configuration server 103 includes message interface 74-3 and actions scripts 42-3, 42-4, and 42-5.

Typically, all communications between an enterprise network 130 and its IM 102 are over network clouds 26 such as the Internet. The firewall 36 typically provides the connection of each enterprise network 130 to the network cloud 26. In one example, the firewall 36 forwards incident data 20 associated with data security incidents detected on ACME's enterprise network 130 to its IM 102-1.

The IM 102 includes a knowledge base 122, an application interface 134, and message destinations 62. Each of the message destinations 62-1 through 62-5 receives messages 40-1 through 40-5, respectfully.

The knowledge base 122 includes a decision tree 18, destination objects 45, action conditions 44, incident objects 41, IAs 120, and notes 121. The knowledge base 122 stores information concerning the data security incidents in objects such as the incident objects 41, IAs 120, and/or notes 121. In one example, the information concerning the data security incidents can include incident data 20 of a data security incident sent to the IM 102 by a device on the enterprise network 130. In another example, the information concerning the data security incidents can include information that IRT personnel 172 append to an object. In yet another example, the information concerning the data security incidents can include information that devices append to the objects via the API 134 of the IM 102.

The incident data 20 is preferably received on the application programming interface (API) 134, which forwards the incident data 20 to the knowledge base 122. Preferably, the IAs 120 and notes 121 are child objects of the incident objects 41 according to an object-oriented inheritance hierarchy and can therefore inherit and/or access the contents of their associated parent incident objects 41.

IRT personnel 172 use an IM user application 39 to enter and configure information within the IM 102 in response to data security incidents that occur within ACME's enterprise network 130. In one example, the IM user application 39 runs within browser 150 of desktop computer 160 on the enterprise network 130. The IM user application 39 sends management information 54 to the IM 102-1 via its application interface 134. In another example, the browser 150 and IM user application 39 run on a mobile computing device 47, such as a tablet device or smart phone connected to the network cloud 26 via a wireless connection 49.

Though the management information 54 is technically passed to the application interface 134 via the firewall 36, the management information 54 conceptually follows a virtual peer-to-peer path between the IM user application 39 and the application programming interface 134. Correspondingly, the firewall 36 receives any acknowledgements or status information sent from the IM 102 back to the IM user application 39 via the application programming interface 134.

The devices are also responsible for security in the enterprise network 130. In one example, a device such as the configuration server 103 is responsible for security across multiple devices. This is true whether the devices are connected on the same network segment 72 or different network segments 72 joined by a router or gateway 34.

Preferably, the action scripts 42 are included within a designated device on the enterprise network such as a configuration server 103. The action scripts 42 in turn include the actions 43 that reference the information concerning the data security incidents. Each action 43 typically includes instructions and/or business logic associated with a specific device in the network 130. The actions 43, and therefore the business logic and/or instructions within the actions 43, reference the information concerning the data security incidents.

In examples, action script 42-3 can execute actions 43-3 on router 34, action script 42-4 can execute actions 43-4 on user account database 58, and action script 42-5 can execute actions 43-5 on firewall 36.

In another example, devices such as desktop computers/laptops 160, asset database 64 and helpdesk system 98 are responsible predominantly only for their own security. Specifically, helpdesk system 98 is responsible only for security associated with its operating system and helpdesk application 38. Asset database 64 is responsible only for security associated with its operating system and assets 59. Desktop computer 160 is responsible only for security associated with its operating system and the IM user application 39.

Message enabled devices of client ACME Company create and maintain data associated with ACME's business interests and objectives. Message enabled devices include a message interface 74 and often include one or more action scripts 42. Examples of message enabled devices include Helpdesk System 98, asset databases 64 and a configuration server 103. The message interfaces 74 are preferably clients of a message queueing service hosted on the Application Server 140. In one example, the message queuing service is Java Messaging Service (JMS). Java is a registered trademark of Oracle, Inc.

IRT personnel 172 configure the action scripts 42 to include references or IDs of specific message destinations 62. Each action script 42 passes the ID of the configured message destination 62 to the message interface 74 of each message enabled device. The message interface 74 then accesses the associated message destination 62. In one example, action script 42-1 is configured to enable helpdesk system 98 to access message destination 62-1 via message interface 74-1. In another example, action script 42-2 is configured to enable asset database 64 to access message destination 62-2 via message interface 74-2. In yet another example, action scripts 42-3 through 42-5 are configured to enable configuration server 103 to access message destinations 62-3 through 62-5, respectfully. The message interface 74 of each message enabled device preferably uses the connection between the enterprise network 130 and the IM 102 provided by the firewall 36 to connect to the message destinations 62 and download the messages 40.

Preferably, the message destinations 62 are implemented in accordance with the Java Message Service (JMS) API. The JMS API allows applications to create, send, receive, and read messages using reliable, asynchronous, loosely coupled communications. The JMS API defines a common set of interfaces and associated semantics that allow programs written in the Java programming language to communicate with other messaging implementations. When using JMS, the sender and receiver need to know only which message format and which destination to use, as the JMS framework abstracts interface details of the senders and receivers.

The ability for each message enabled device to access its associated message destination 62 can also be thought of as a virtual connection 51 between the message interface 74 of a device and its associated message destination 62. Specifically, as a result of configuration of the action scripts 42, virtual connection 51-1 is provided between message interface 74-1 and message destination 62-1. Virtual connection 51-2 is provided between message interface 74-2 and message destination 62-2. Virtual connection 51-3 is provided between message interface 74-3 and message destination 62-3. Virtual connection 51-4 is provided between message interface 74-3 and message destination 62-4. Finally, virtual connection 51-5 is provided between message interface 74-3 and message destination 62-5.

In a preferred implementation, each message enabled device then downloads the messages 40 from the message destinations 62 via the virtual connections 51. In another implementation, the IM 102 sends the messages 40 from the message destinations 62 directly to the message enabled devices via the virtual connections 51.

Within each message enabled device, the message interface 74 then passes the downloaded messages 40 back to the action scripts 42. The action scripts 42 extract the information concerning the data security incidents from the downloaded messages 40, and execute actions 43 within the action scripts 42 that reference the information concerning the data security incidents on the devices. Typically, the actions 43 include business logic that references the information concerning the data security incidents.

Specifically, action script 42-1 of helpdesk system 98 executes actions 43-1 that reference the information concerning the data security incidents extracted from downloaded messages 40-1. The actions 43-1 cause changes to the helpdesk application 38 of the of helpdesk system 98. For example, action script 42-1 can include business logic that notifies the Helpdesk System 98 to "whitelist" or allow access to only a limited list of email contacts in response to an email spamming data security incident. In a similar fashion, action script 42-2 of asset database 64 executes actions 43-2 that reference the information concerning the data security incidents extracted from downloaded messages 40-2.

In contrast, action scripts 42-3 through 42-5 of the configuration server 103 execute actions 42 on other devices in the enterprise network 130. Action script 42-3 executes actions 43-3 that reference the information concerning the data security incidents extracted from downloaded messages 40-3. The actions 43-3 cause changes to router 34. Action script 42-4 executes actions 43-4 that reference the information concerning the data security incidents extracted from downloaded messages 40-4. The actions 43-3 cause changes to user account database 58 and its user accounts 60. Finally, action script 42-5 executes actions 43-5 that reference the information concerning the data security incidents extracted from downloaded messages 40-5. The actions 43-5 cause changes to firewall 36.

Message enabled device& can also update the information concerning the data security incidents via the API 134 of the IM 102. In one implementation, the API 134 is a REST (REpresentational State Transfer) API. REST is a simple client/server based way to organize interactions between independent systems. REST clients hold a representation of a server resource in document form, typically in xml or JSON format. REST runs on top of HTTP and uses standard HTTP methods GET. POST. PUT, and DELETE. Servers respond with an HTTP response (status, body). The application server 140 also functions as a REST server for this purpose.

Via REST connections, message enabled devices in the enterprise network 130 can update and annotate the information concerning the incidents (e.g. the incident objects 41, notes 121, and IAs 120) within the knowledge base 122 of the IM 102. This provides a feedback path for devices to update the IAs 120, notes 121, and incident objects 41 of the IM 102 with private or client-specific data.

Figure 1B:
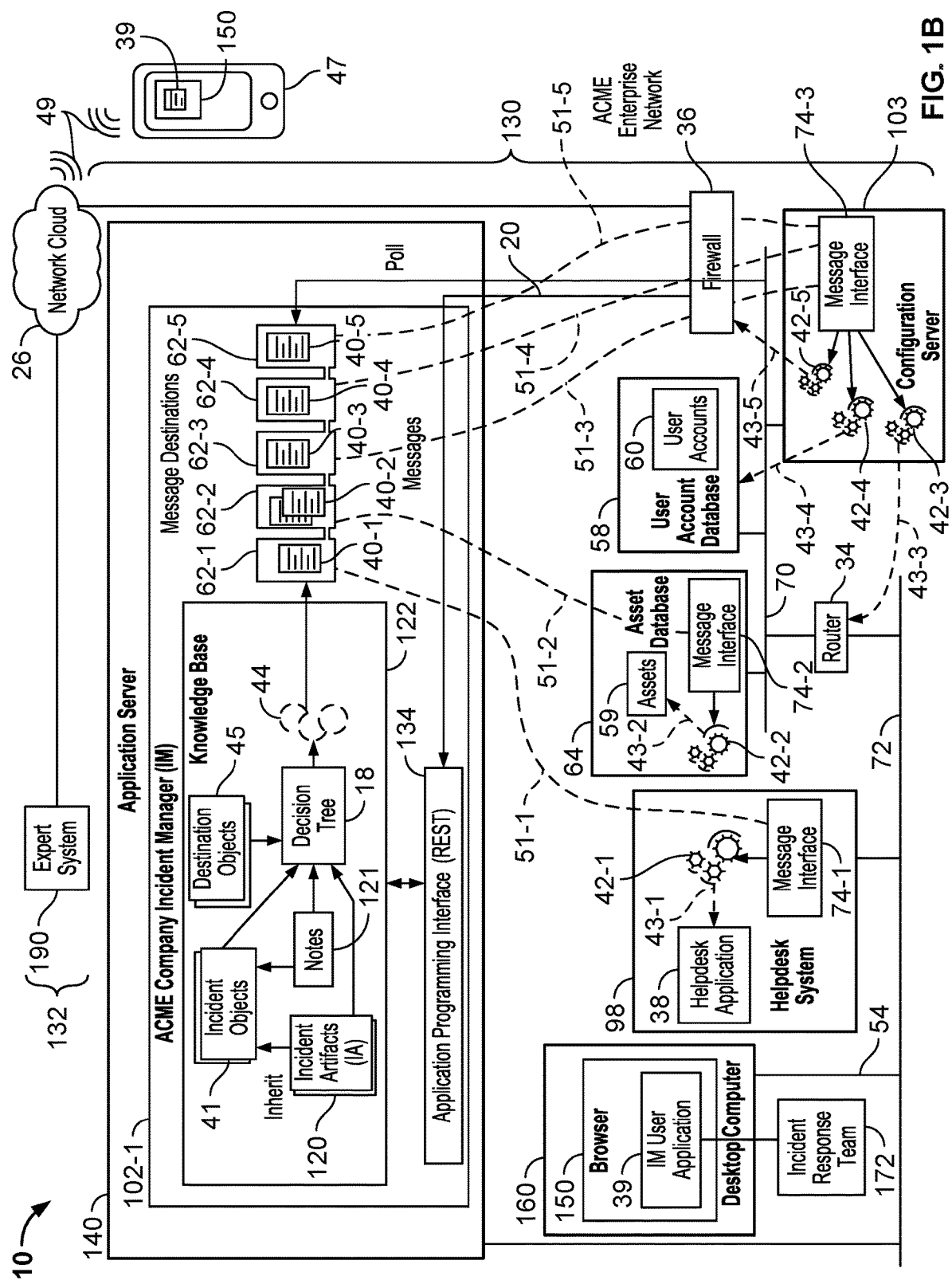
FIG. 1B is a block diagram showing a preferred on-premises embodiment of an IM application, where the IM is included within each client enterprise network.

FIG. 1B shows a preferred "on premises" embodiment of an incident response system 10. Unlike the embodiment of FIG. 1A, the application server 140 resides within the client's enterprise network 130 and includes only the IM 102 for the current enterprise network 130. The service network 132 is also much smaller in scope and typically includes only the expert system 190 for managing information across IMs 102 of different client enterprise networks 130. Only the enterprise network 130 of exemplary client ACME Company is shown.

Figure 2:
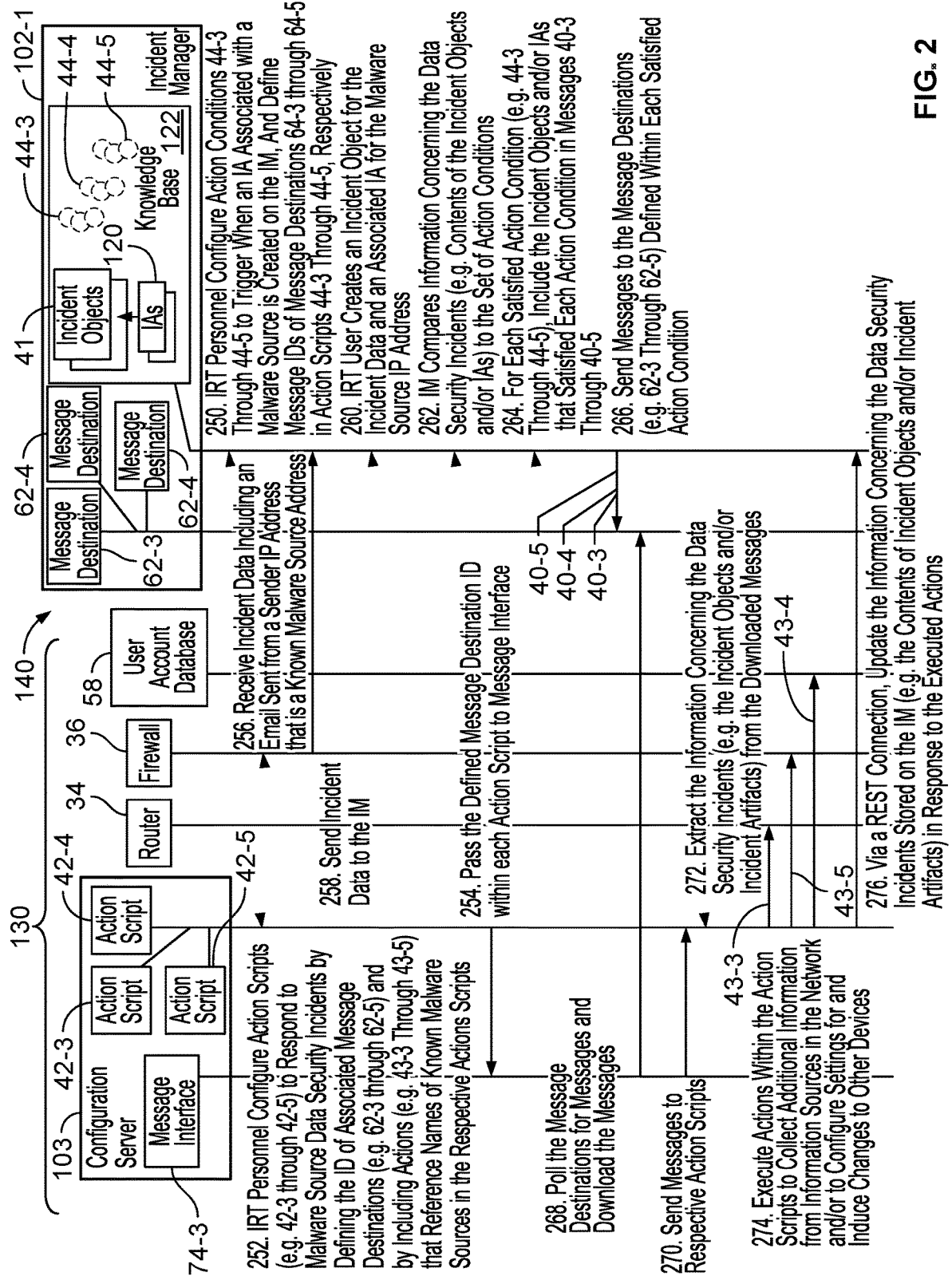
FIG. 2 is a sequence diagram that displays messages exchanged between an IM and a configuration server device in client ACME's enterprise network, where the configuration server enables configuration of other systems and devices lacking message interfaces.

FIG. 2 is a sequence diagram that shows messages exchanged between devices in ACME's enterprise network 130 and the IM 102-1. The messages are exchanged in response to IRT personnel 172 configuring the IM 102 and the devices to respond to data security incidents, and in response to the IM 102 determining information concerning data security incidents matching the configured information on the IM.

Specifically, the diagram shows message detail fora configuration server 103 device in ACME's enterprise network 130 that carries out responses to data security incidents on other devices within the network 130. The configuration server 103 includes action scripts 42-3 through 42-5, which include actions 43-3 through 43-5, respectfully. In one example, the action scripts 42 are Java programs.

Action scripts 42 can execute actions on other devices that are message enabled or not, as long as the action scripts 42 can interact with the devices over the enterprise network 130. For example, the configuration server 103 in FIG. 2 is a message enabled device that preferably executes actions in response to data security incidents on other devices in the network 130, where the other devices are not message enabled devices (e.g. router 34, firewall 36, and user account database 58).

In step 250. IRT personnel 172 configure action conditions 44-3 through 44-5 to trigger when an IA 120 associated with a malware source is created on the IM 102, and define message IDs of message destinations 64-3 through 64-5 in action scripts 44-3 through 44-5, respectively. It is important to note that upon completion of step 250, the IRT user 172 has defined the specific types of information that each message destination 62 will include or be associated with, once the message destinations 62 begin receiving messages 40 sent by the IM 102 in response to satisfaction of the action conditions 44.

In step 252. IRT personnel 172 then configure action scripts 42-3 through 42-5 on the configuration server 103 to respond to malware source data security incidents by defining the ID of associated message destinations 62-3 through 62-5 and by including actions 43-3 through 43-5 that reference names of known malware sources in the respective actions scripts 42-3 through 42-5.

According to step 254, the actions scripts 42-2 through 42-5 pass their defined message destination IDs within each action script 42 to the message interface 74-3 of the configuration server 103. Note that upon completion of step 254, the IRT user 172 has also created the virtual connections 51-3 through 51-5 between message interface 74-3 and message destinations 62-3, 62-4, and 62-5, respectfully.

In step 256, the firewall 36 or possibly an email server receives incident data 20 including an email sent from a sender IP address that is a known malware source address. The firewall 36 or email server sends the incident data 20 to the IM 102 in step 258. According to step 260, IRT personnel 172 create an incident object 41 for the incident data 20 and an associated IA 120 for the malware source IP address. In another example, the IM 102 itself can automatically create the incident object 41 and the IA 120 in response to receiving the incident data 20.

In step 262, the IM 102 compares information concerning the data security incidents (e.g. contents of the incident objects 41 and/or IAs 120) to the set of action conditions 44. Note that the comparison or lookup will include all incident objects 41 and/or IAs 120 currently stored on the knowledge base, including the newly created incident object 41 and IA 120 created in response to the IM 120 receiving the incident data 20 associated with the malware source.

Then, for each satisfied action condition (e.g. 44-3 through 44-5), the IM 120 includes the incidents objects 41 and/or IAs 120 that satisfied each action condition 44-3 through 44-5 in messages 40-3 through 40-5, respectively, in step 264. Because the newly created incident object 41 and associated IA 120 for the malware source IP address are the information concerning the malware source address data security incident that satisfies action conditions 44-3 through 44-5, the IM 104 includes these objects or information from these objects in the messages 44. The IM 102 sends messages 40-3 through 40-5 to the message destinations 62-3 through 62-5 defined within each satisfied action condition 44-3 through 44-5 in step 266.

Via its message interface 74-4, configuration server 103 polls the defined message destinations 62-3 through 62-5 for messages 40-2 through 40-5, respectfully, downloads the messages, and then sends the messages 40-3 through 40-5 to respective action scripts 42-3 through 42-5. In step 272, action scripts 42-3 through 42-5 extract the information concerning the data security incidents (e.g. the incident objects 41 and/or IAs 120) from the downloaded messages 40-3 through 40-5.

Then, in step 274, actions 43-3 through 43-5 of action scripts 42-3 through 42-5 are executed to collect additional information from information sources in the network 130 and/or to configure settings and induce changes to other devices in ACME's enterprise network 130. The actions 43 additionally include business logic that references the information concerning the data security incidents extracted from the messages. In the example, the configuration server 103 executes action 43-3 of action script 42-3 upon router 34, action 43-4 of action script 42-4 upon user account database 58, and action 43-5 of action script 42-5 upon firewall 36.

In one example, action 43-3 can notify router 34 to quarantine a malware infected client machine by segmenting traffic from a subnetwork 72 to which the client machine attaches, in response to a member of the IRT 172 updating an incident artifact 120 to include the name of the infected client machine. In another example, action 43-4 can instruct the user account database 58 to lock access to a malware infected user account 60 in response to creation of a user account artifact 120 by a member of the IRT 172, where the user account artifact 120 indicates malware. In yet another example, action 43-5 can instruct the firewall 36 to block incoming messages, when the messages include a sender IP address matching the IP address of the IA 120 that IRT 172 members created in response to receiving malware.

In this way, the IM 102 can provide an automated incident response capability by implementing actions 43 in response to incidents across both message enabled and non-message enabled devices alike. In other examples, action 43-5 of action script 42-5 can include business logic to close ports on firewall 36 in response to a DDoS attack data security incident, and to quarantine all messages that include the spoofed source IP address.

In yet another example, action 43-4 of action script 42-4 can include business logic to update action control lists and user accounts 60 within the user account database 58, to "blacklist" or deny access to names of suspicious individuals posing as employees in response to phishing incidents. In still another example, action 43-3 of action script 42-3 can include business logic that notifies router 34 to block forwarding of IP address data resources associated with a spoofed source IP address incident.

Finally, via a API 134 of the IM 102, the action scripts 42 can "reach back" into the IM 102 and annotate the objects within the IM 102. In a preferred implementation, the action scripts 42 use a REST API 134 of the IM 102 for this purpose. In step 276, via the REST API 134, the action scripts 42-3 through 42-5 update the information concerning the data security incidents stored on the IM 102 in response to the actions executed in step 274. For example, in response to creation of a hash incident artifact 120 by a member of the IRT 172, action script 42-3 can push/POST the contents of private data maintained on the user account database 58 to the knowledge base 122 of the IM 102. The private data is then appended to incident objects 41, notes 121, and/or IAs 120.

Figure 3A:
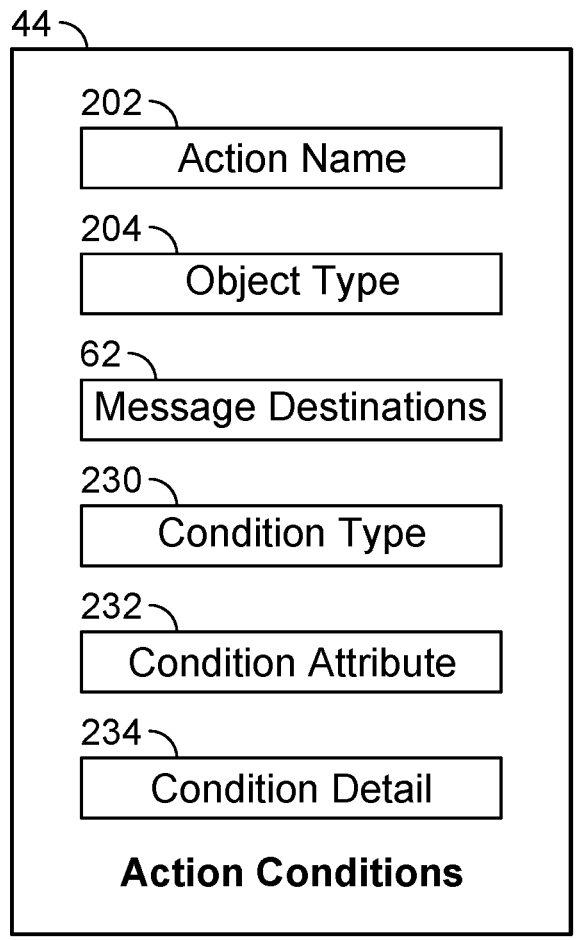
FIGS. 3A and 3B show details for action conditions and destination objects, respectfully.

FIG. 3A displays exemplary fields of an action condition 44. The fields include an action name 202, object type 204, message destinations 62, condition type 230, condition attribute 232, and condition detail 234.

Figure 3B:
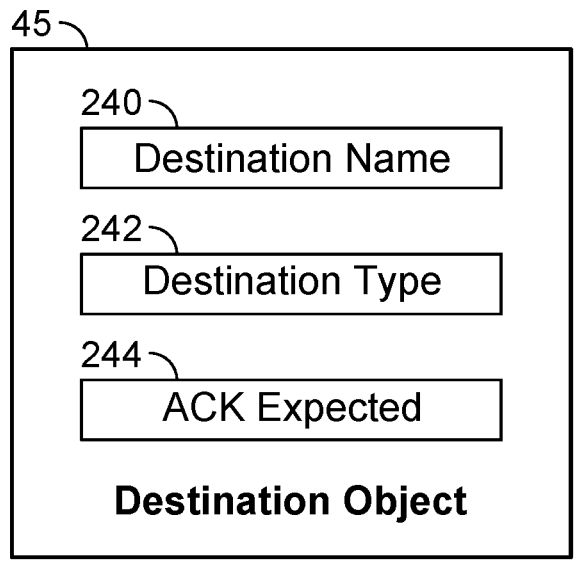

FIG. 3B displays exemplary fields of a destination object 45. The fields include a destination name or ID 240, a destination type 242, and an ACK expected 244. The ACK expected 244 field is preferably a Boolean value. When defined as true, it provides a mechanism where message clients such as the action scripts 42 expect an acknowledgment from the IM 102 after the action scripts 42 execute actions.

Figure 4:
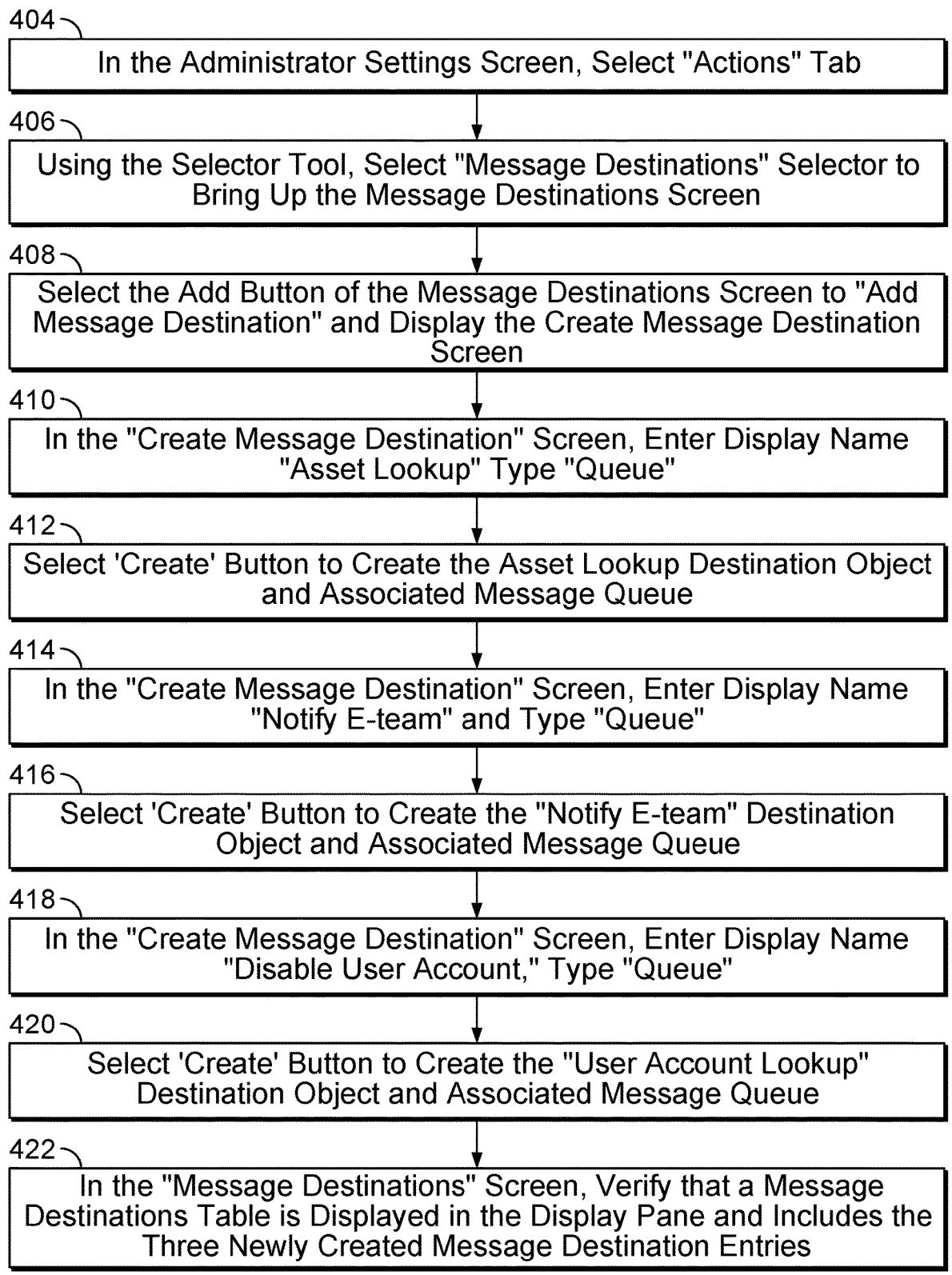
FIG. 4 is a flow chart that describes a method for creating and configuring message destinations for the IM, where users of the Incident Response Team (IRT) use an IM user application running within a browser on a desktop computer to create three exemplary message destinations.

FIG. 4 displays a method for creating and configuring three exemplary message destinations 62. The message destinations 62 are created by members of the IRT 172 using the screens of the IM user application 39.

Steps 404 through 412 define creation of an initial message destination 62. The message destination 62 is referenced in the description that accompanies FIG. 7B, included herein below, for creating an exemplary manual action condition 44.

In step 404, in the Administrator Settings screen 600, a user such as IRT personnel 172 selects "Actions" tab 310-10.

Figure 5A:
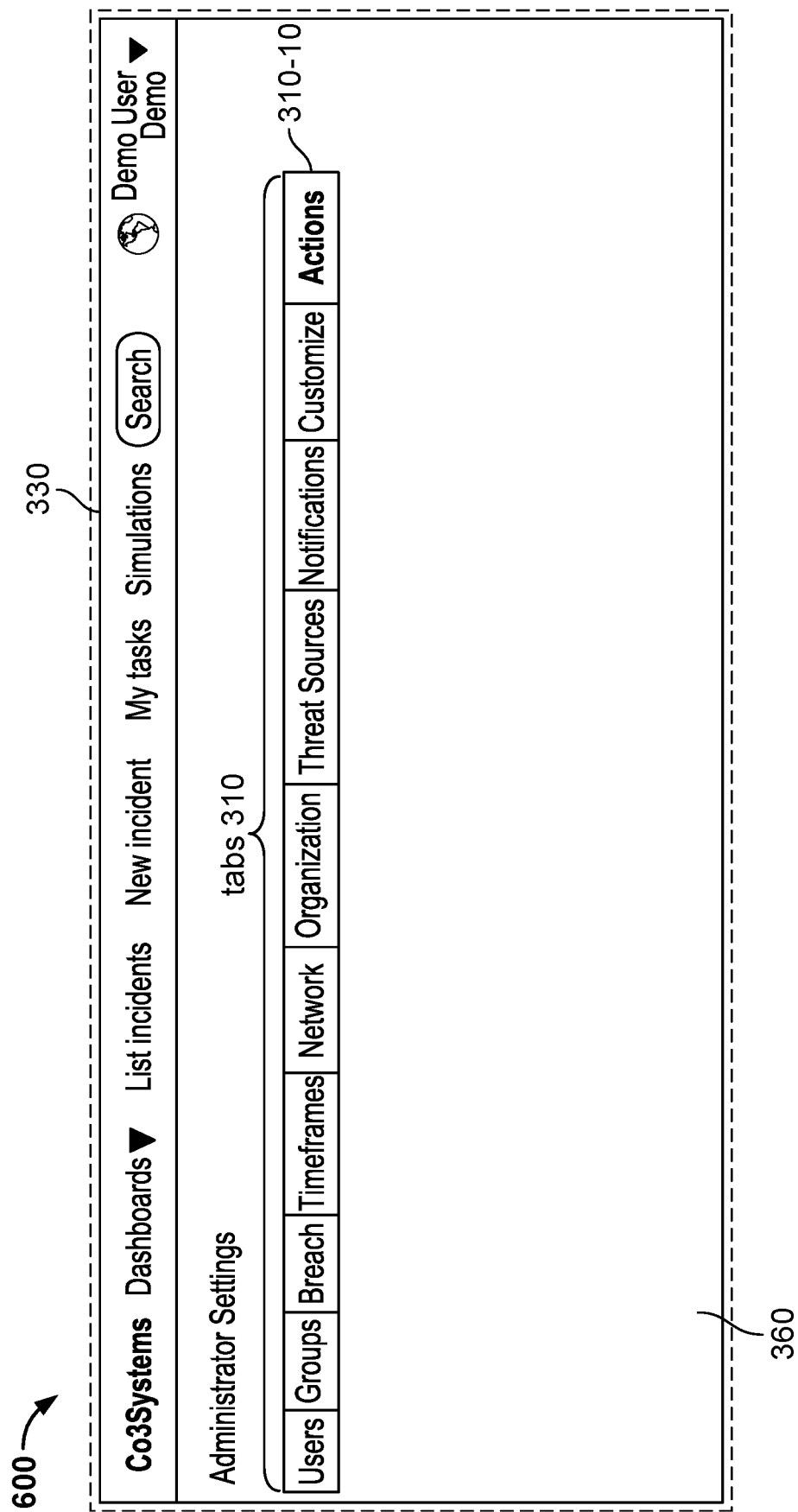
FIG. 5A shows an Administrator Settings Screen of the IM user application.

FIG. 5A shows the Administrator Settings Screen 600 of the IM user application 39. It includes a main taskbar 330, and a display pane 360 for displaying information associated with the selection of tabs 310, the selection of which navigate the user to different types of Administrator Settings. The actions tab 310-10 enables users to configure action conditions 44, both manual and automatic. The Administrator Settings Screen 600 is the starting point for user creation of both message destinations 62 and action conditions 44.

Returning to FIG. 4, according to step 406, using the selector tool 312, IRT personnel 172 select "Message Destinations" selector 312-1 to bring up the Message Destinations screen 610.

Figure 5B:
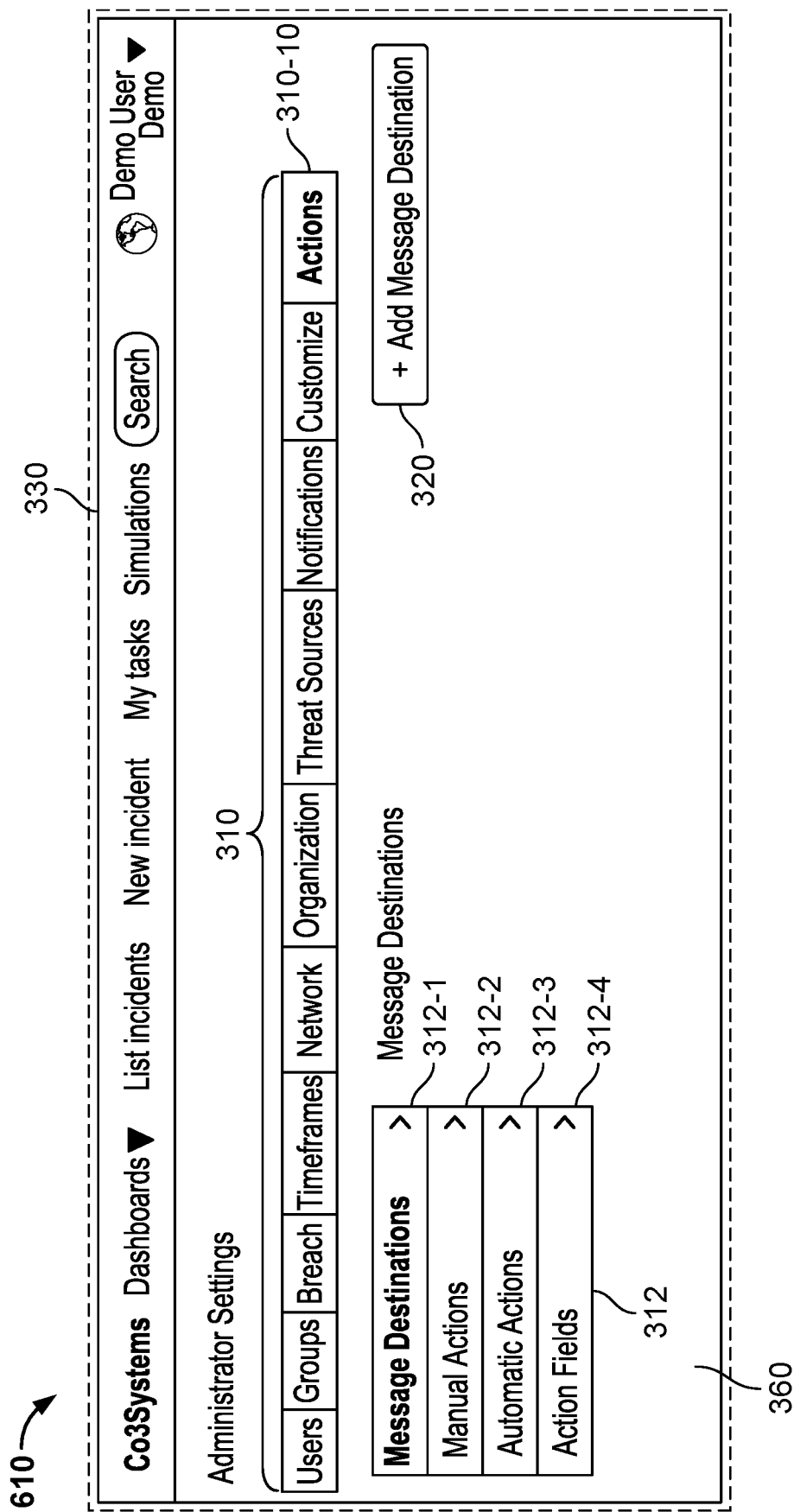
FIG. 5B shows a Message Destinations Screen of the IM user application when no message destinations are currently configured.

FIG. 5B shows the Message Destinations Screen 610 of the IM user application 39. It is displayed in response to selection of the message destinations selector 312-1 of the selector tool 312. Other selectors include the manual actions selector 312-2, the automatic actions selector 312-3, and the action fields selector 312-4. Note that the display pane 360 does not show any message destinations 62 currently configured.

Returning to FIG. 4, in step 408, select the Add Button 320 of the Message Destinations Screen 610 to "Add Message Destination" and display the Create Message Destination Screen 620.

Figure 5C:
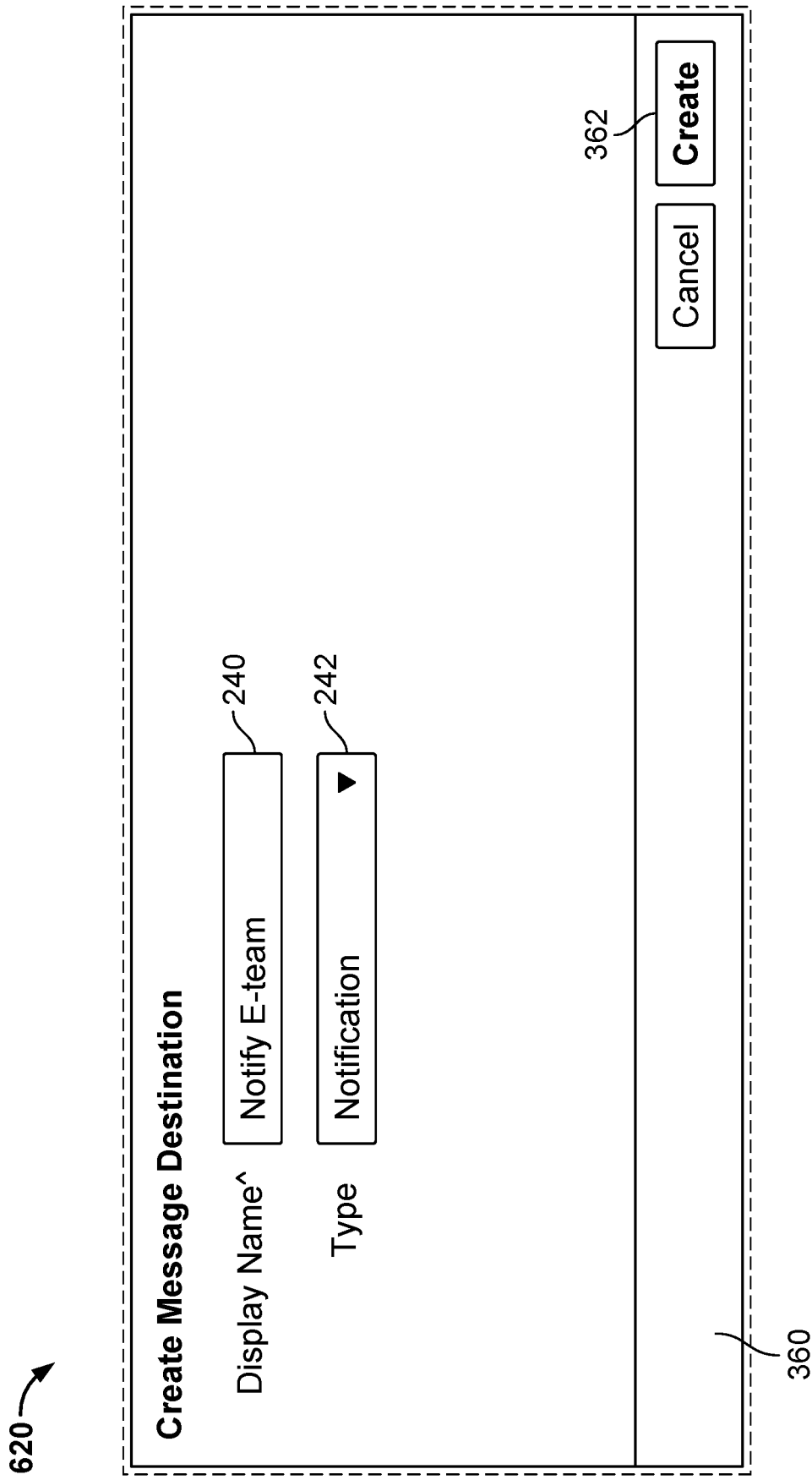
FIG. 5C shows a Create Message Destinations Screen of the IM user application for creating message destinations.

FIG. 5C shows the Create Message Destinations Screen 620 of the IM user application 39 for creating and configuring message destinations 62. Users specify a destination name or ID 240, a type 242, and then select the create button 362 to create the message destination 62.

Returning to FIG. 4, in step 410, in the "Create Message Destination" screen 620, IRT personnel 172 enter Display Name 240 "Asset Lookup," type 242 "queue." Then, in step 412, IRT personnel 172 select 'create' button 362 to create the Asset Lookup destination object 45 and associated message queue 62.

Steps 414 through 416 define creation of another message destination 62. The message destination 62 is referenced in the description that accompanies FIG. 11A, included herein below, for creating an exemplary first automatic action condition 44.

Returning to FIG. 4, according to step 414, in the "Create Message Destination" screen 620, IRT personnel 172 enter Display Name 240 "Notify E-team," and type "queue" 242. In step 416, IRT personnel 172 select 'create' button 362 to create the "Notify E-team" destination object 45 and associated message queue 62.

Steps 418 through 420 define creation of yet another message destination 62. The message destination 62 is referenced in the description that accompanies FIG. 13A, included herein below, for creating an exemplary second automatic action condition 44.

In step 418, in the "Create Message Destination" screen 620, IRT personnel 172 enter Display Name 240 "Disable User account," type "queue" 242. In step 420. IRT personnel 172 select 'create' button 362 to create the "User account lookup" destination object 45 and associated message queue 62. Finally, according to step 422, in the "Message Destinations" screen 610, IRT personnel 172 verify that a Message Destinations table 340 is displayed in display pane 360 and includes the three newly created entries for the message destinations 62.

Figure 5D:
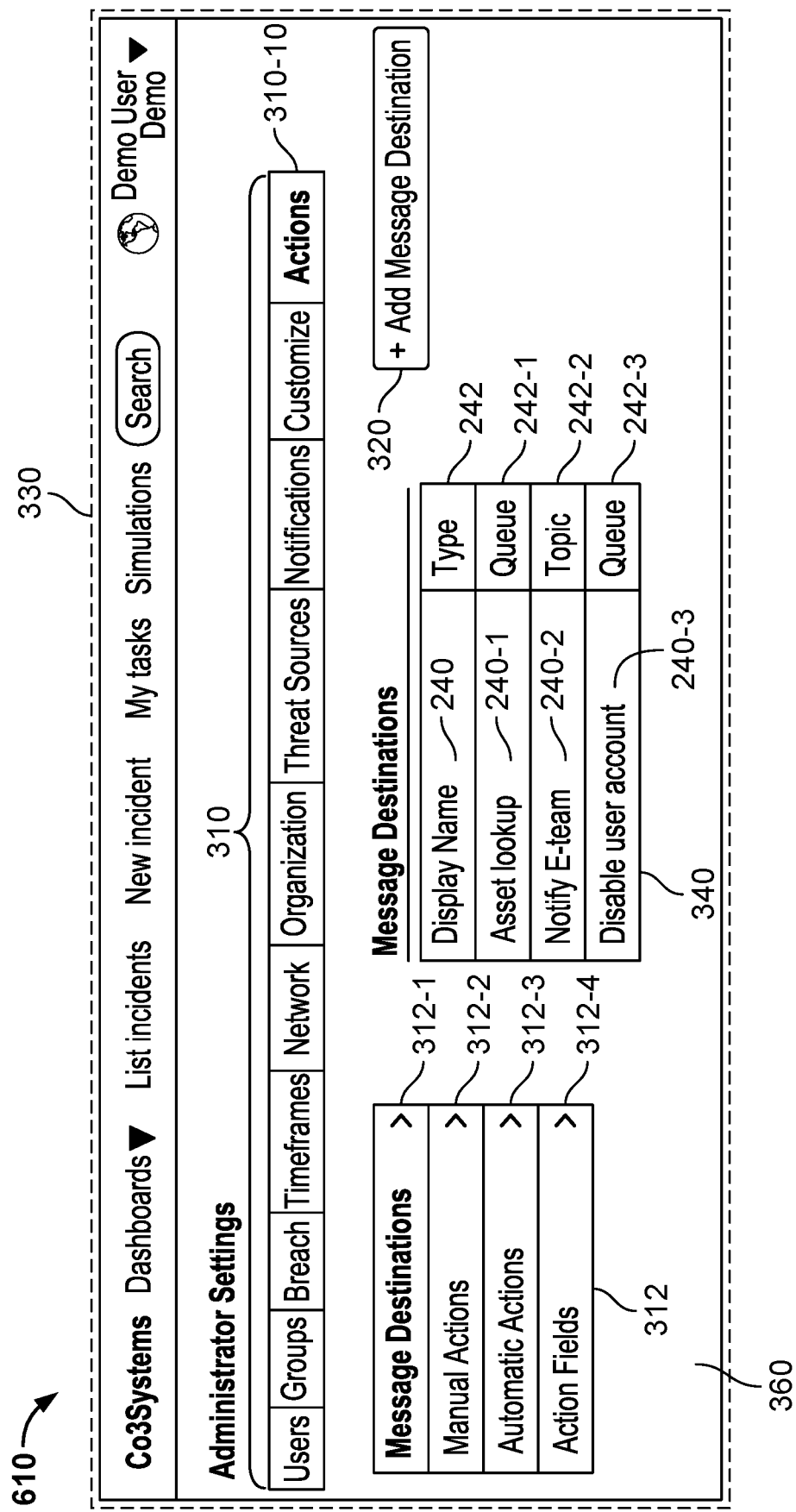
FIG. 5D shows the Message Destinations Screen of the IM user application, and lists the three message destinations created in FIG. 4.

FIG. 5D shows the contents of the Message Destinations Screen 610 upon completion of the method of FIG. 4. The message destinations table 340 includes the three message destinations 62 created in FIG. 4, with display names 240-1 through 240-3 and types 242-1 through 242-3, inclusive.

Figure 6:
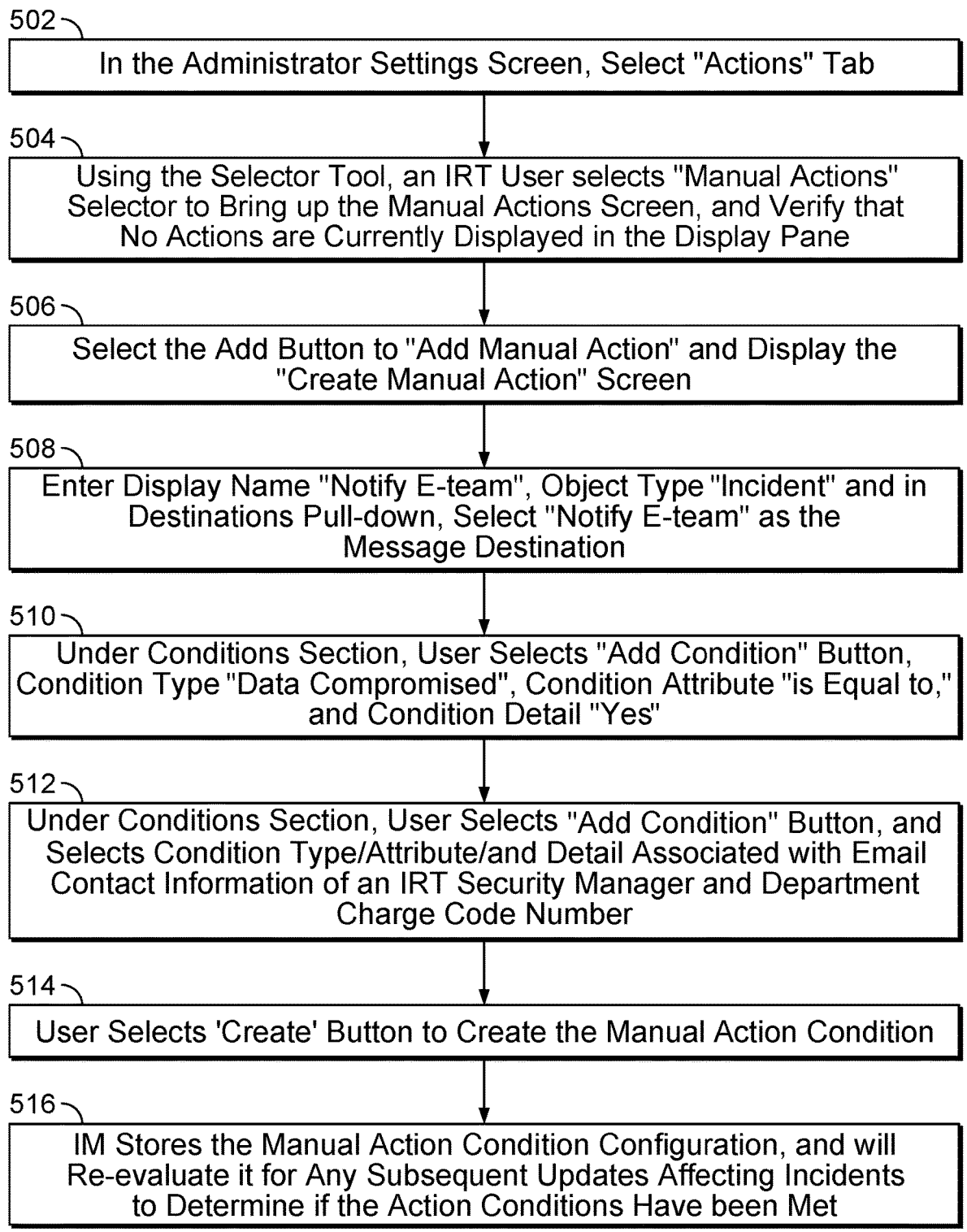
FIG. 6 is a flow chart that describes a method for creating a manual action condition in the IM user application, created in response to an exemplary data security incident involving compromised data.

FIG. 6 is a method for creating and configuring an exemplary manual action condition 44 in response to a data security incident involving compromised data detected within client ACME's enterprise network 130.

In step 502, in the Administrator Settings 610 screen, IRT personnel 172 select the "Actions" tab 310-10. In step 504, using the selector tool 312. IRT personnel 172 select the "Manual Actions" selector 312-2 to bring up the Manual Actions screen 630, and verify that no actions are currently displayed in the display pane 360.

Figure 7A:
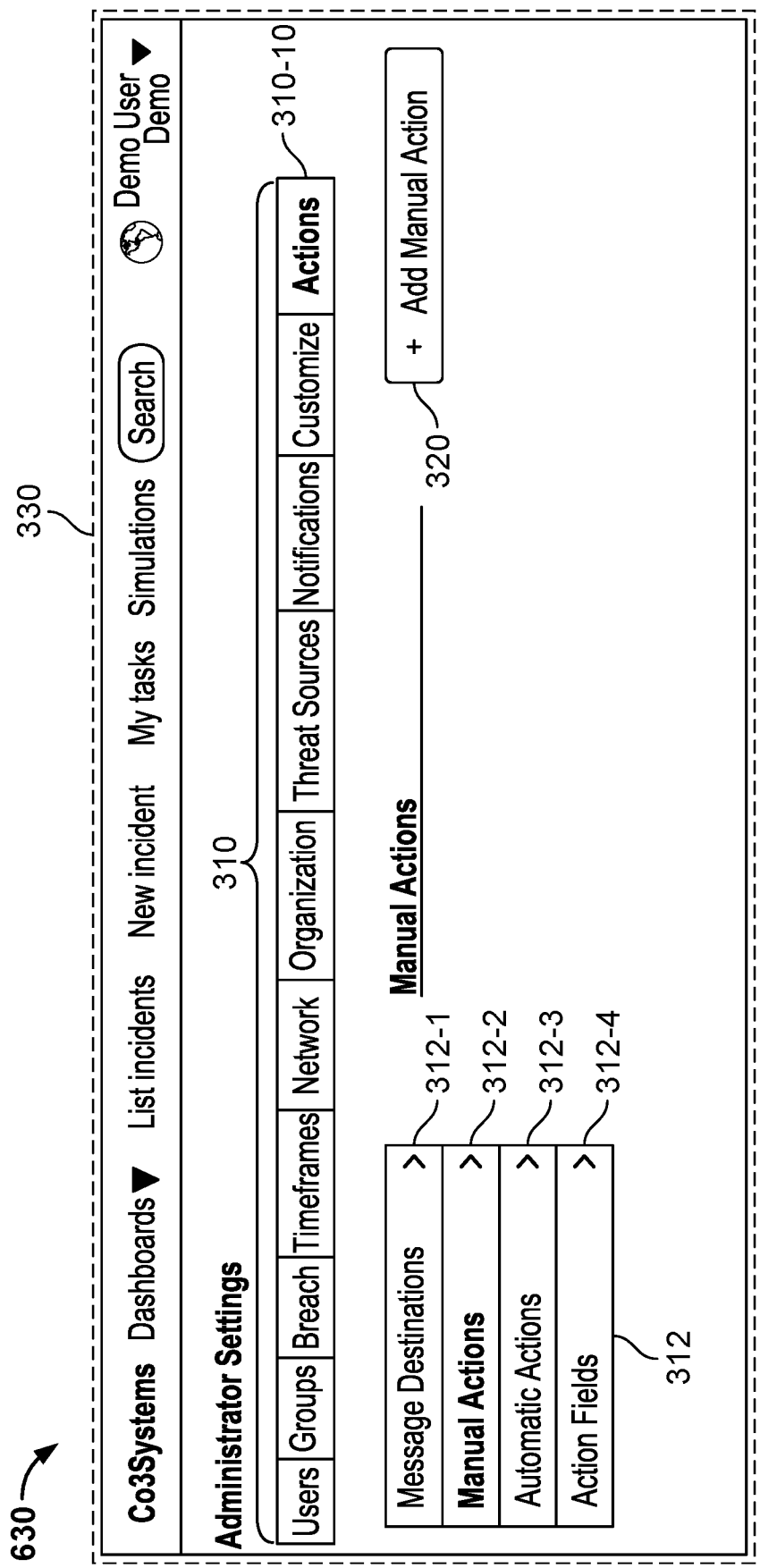
FIG. 7A shows the Manual Actions Screen of the IM user application when no manual actions are currently configured.

FIG. 7A shows the Manual Actions Screen 630 of the IM user application 39. Currently, no manual action conditions 44 are configured. As a result, no manual action conditions are displayed in the display pane 360.

Returning to FIG. 6, in step 506. IRT personnel 172 select the Add Button 320 to "Add Manual Action" and display the "Create Manual Action" screen 630.

Figure 7B:
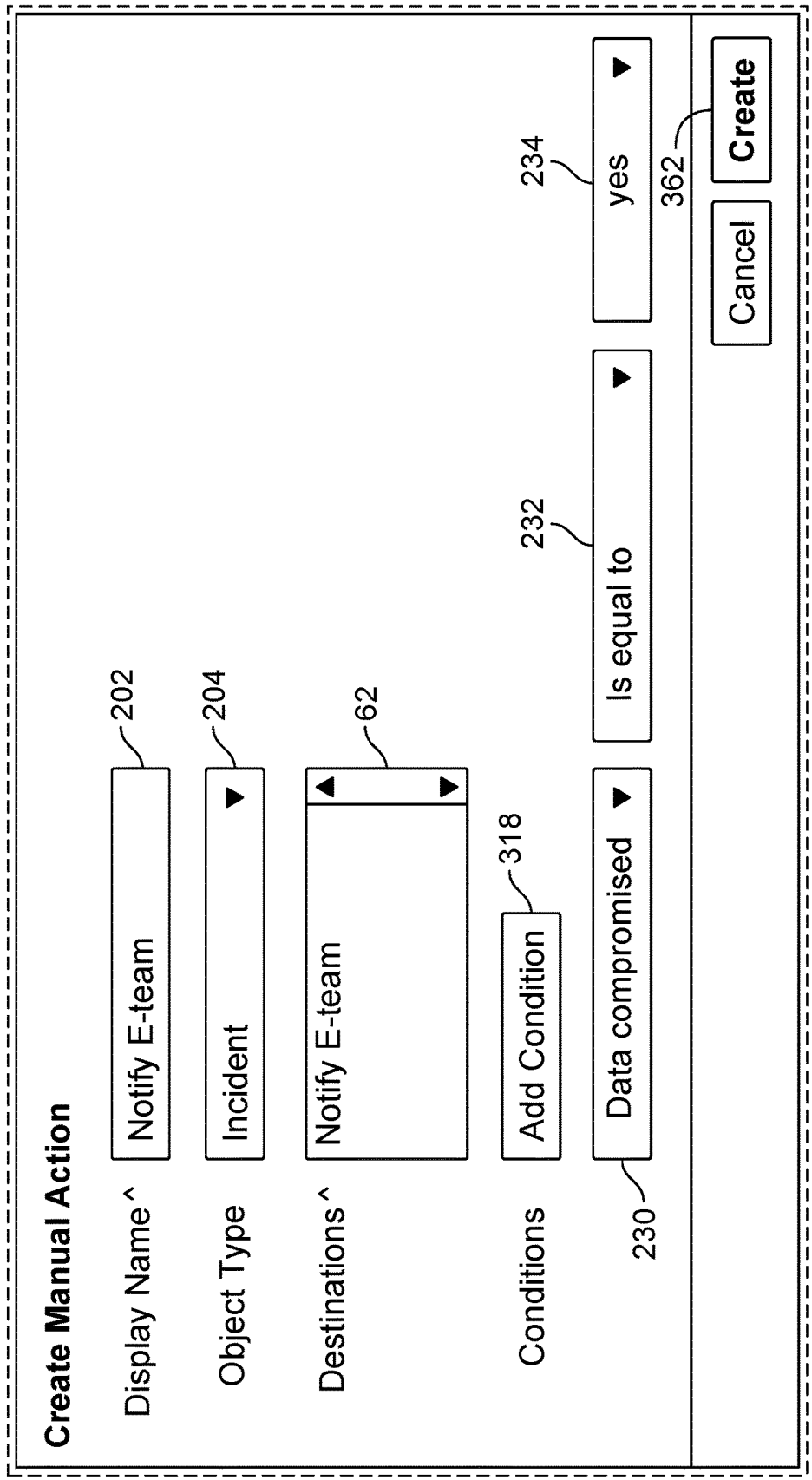
FIG. 7B shows the Create Manual Actions Screen of the IM user application for creating manual action conditions.

FIG. 7B shows the Create Manual Action Screen 640 of the IM user application 39. In addition to specifying a display name 202, object type 204, and destination 62, users create and define conditions for the manual action condition 44. Using the condition button 318, users define a condition type 230, condition attribute 232, and condition detail 234.

Returning to FIG. 6, in step 508, the user enters display name 202 "Notify E-team", object type 204 "Incident" and in Destinations pull-down, a user selects "Notify E-team" as the message destination 62. Then, in step 510, under the Conditions section, a user selects "Add Condition" button 318, condition type 230 "Data compromised," condition attribute 232 "is equal to," and selects condition detail 234 "yes."

In step 512, under the Conditions section, a user selects "Add Condition" button 318, and selects condition type 230/attribute 232/and detail 234 associated with email contact information of an IRT 172 security manager and department charge code number. In step 514, the user selects the 'create' button 362 to create the manual action condition 44.

Figure 7C:
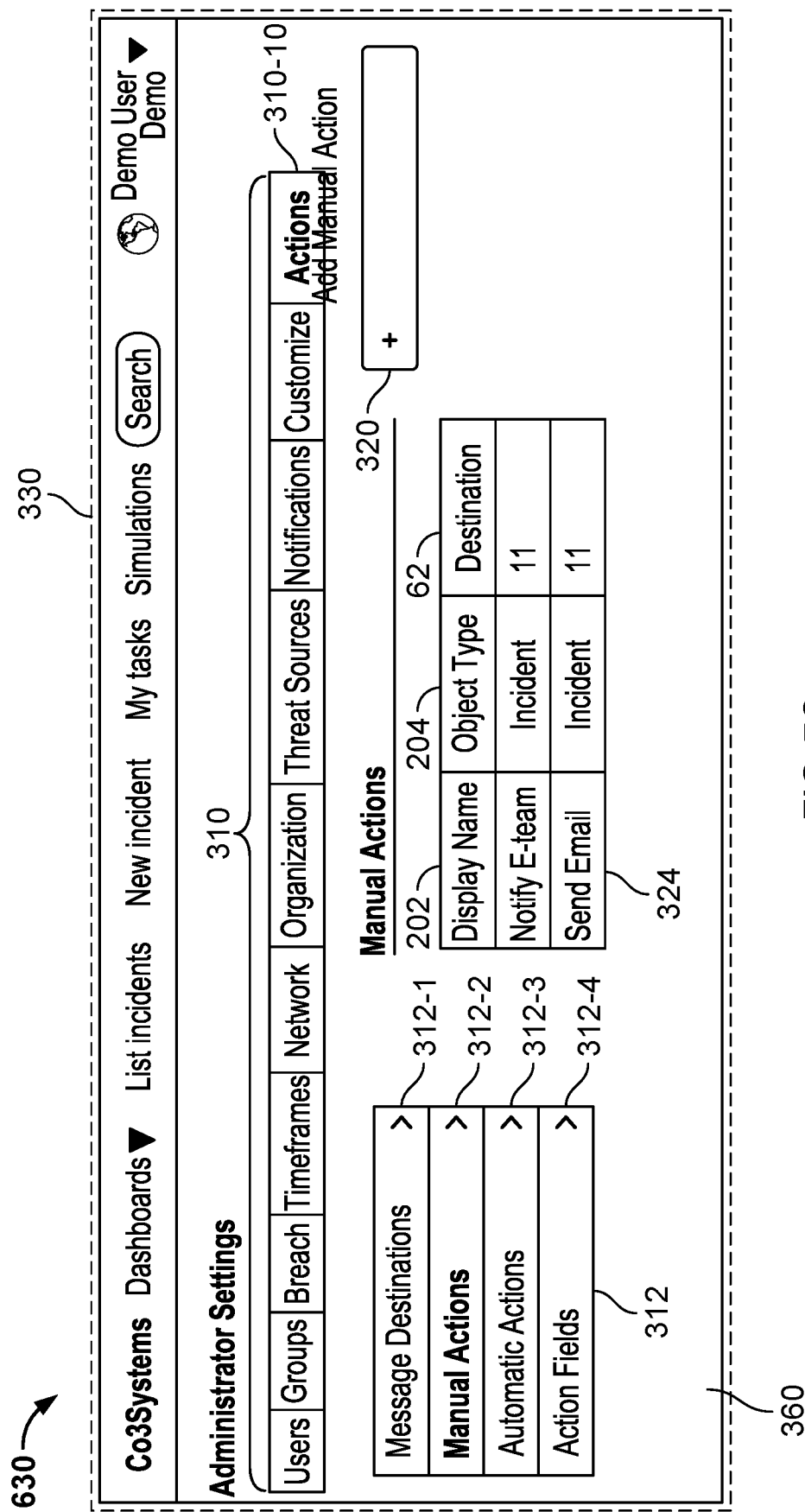
FIG. 7C shows the Manual Actions Screen of the IM user application, and lists the manual action condition configured in FIG. 6.

FIG. 7C shows the contents of the Manual Actions Screen 630 of the IM user application 39 upon completion of step 514 in FIG. 6. The manual action conditions 44 are displayed in the actions table 324. The manual action conditions 44 are associated with the same message destination 62 and object type 204.

Returning to FIG. 6, in step 516, the IM 102 then stores the manual action condition 44 configuration. The IM will re-evaluate the manual action condition 44 for any subsequent updates affecting incidents to determine if the action conditions 44 have been met.

Figure 8A:
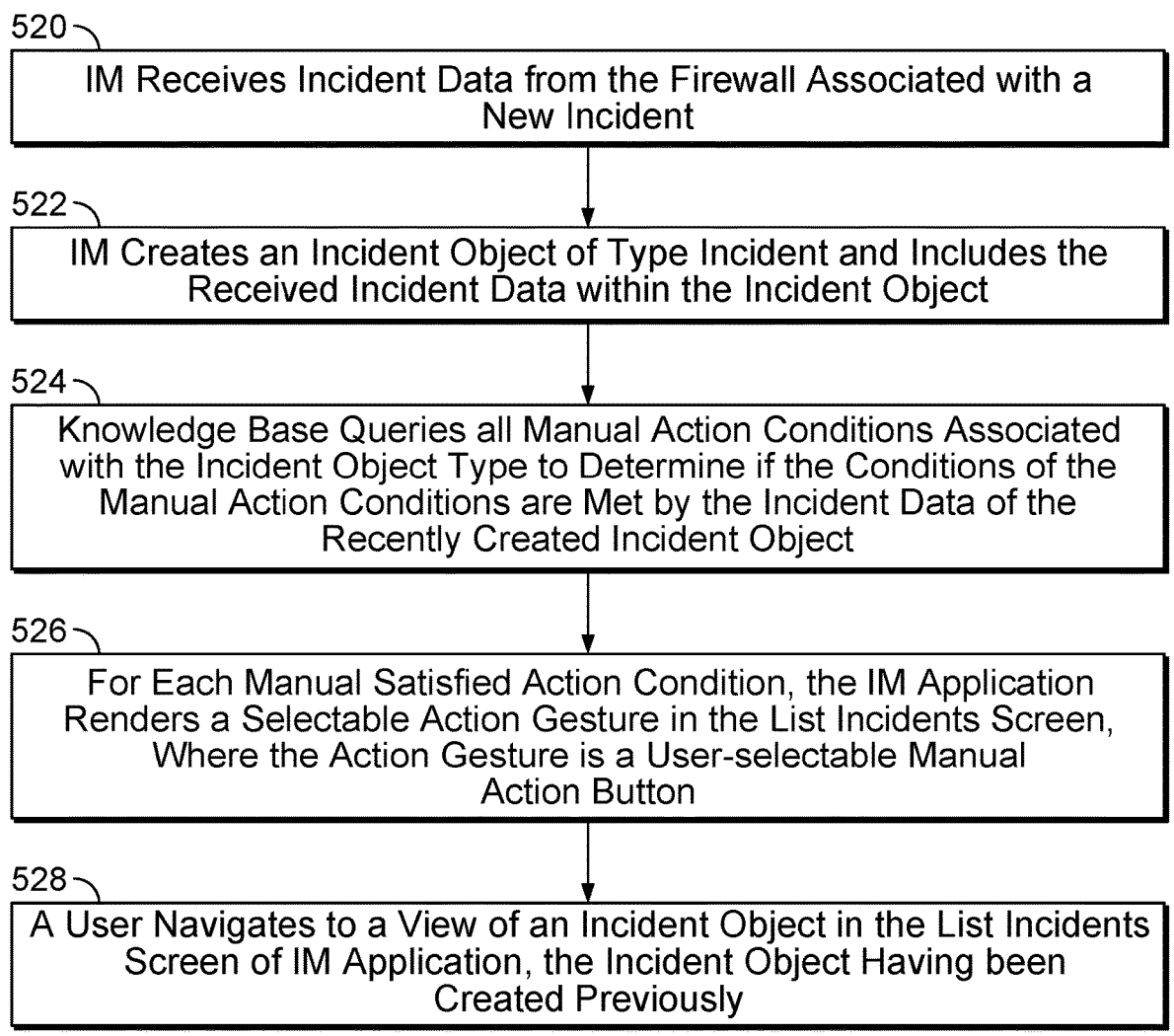
FIG. 8A is a flow chart that describes a method for how the IM renders a selectable, GU button action gesture in a screen of the IM user application, where the button is rendered in response to information concerning a data security incident that satisfies the manual action condition of FIG. 6.

FIG. 8A describes a method for how the IM 102 places a GUI manual action button 326 on a screen of the IM user application 39 for users to execute, when the conditions of the manual action condition 44 of FIG. 6 are satisfied.

In step 520, the IM 102 receives incident data 20 from the firewall 36 associated with a new incident. In step 522, the IM 102 creates an incident object 41 of type Incident and includes the received incident data within the incident object 41.

Then, in step 524, the knowledge base 122 queries all manual action conditions 44 associated with the Incident type to determine if the conditions of the manual action conditions 44 are satisfied by the incident data 20 of the recent incident (e.g. the contents of the incident object 41 and any associated IAs 120). In general, the knowledge base 122 continuously determines in real-time if the state of any metadata such as IAs 120 have changed, and if incident data 20 of new incidents and events associated with incidents have been received. The decision tree 18 determines if any of this information meets the conditions of any currently configured manual or automatic action conditions 44.

According to step 526, for each satisfied manual action condition 44, the IM user application 39 renders a selectable action gesture in the List Incidents Screen 640. In one example, the action gesture is a user-selectable Manual Action Button 324. In step 528, a user navigates to a view of an Incident object 41 in the List Incidents screen 640 of the IM user application 39, the Incident object 41 having been created previously.

FIG. 9 shows the List Incidents Screen 650 of the IM user application 39. It displays all currently configured Incident objects 41. The user-selectable Manual Action Button 324 is displayed. The Manual Action Button 324 was rendered by the IM user application 39 in response to satisfaction of one or more manual action conditions 44 upon completion of step 526 in FIG. 8A.

Returning to FIG. 8A, in step 528, a user navigates to a view of an Incident object 41 in the List Incidents Screen 650 of the IM user application 39, the Incident object 41 having been created previously by the IRT 172 for an incident.

Figure 8B:
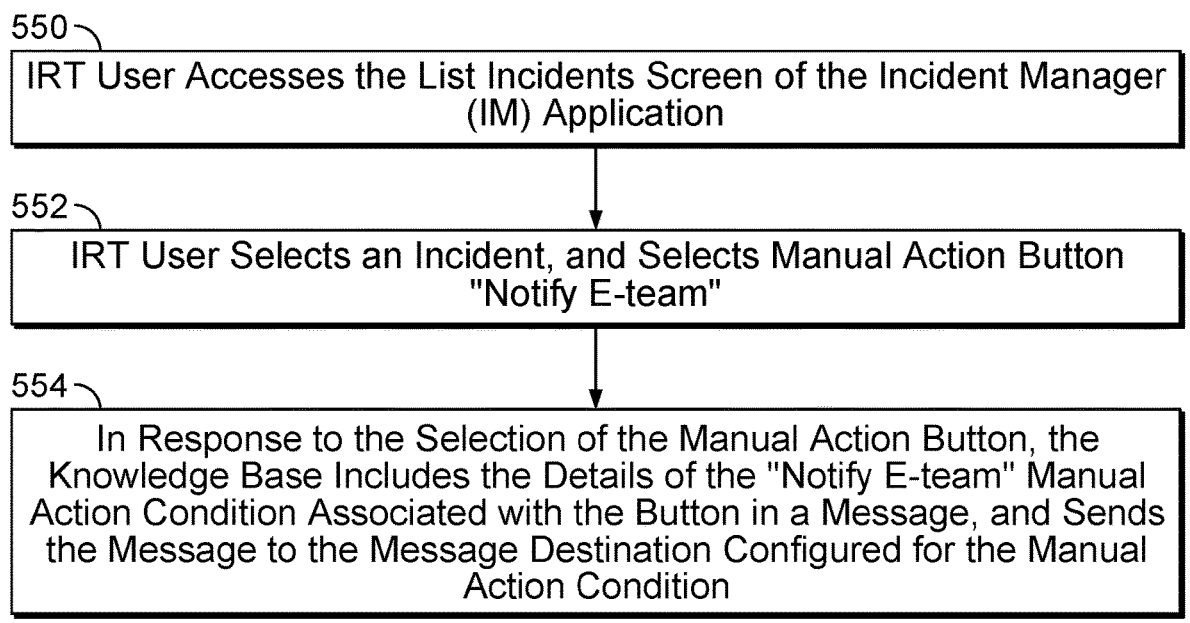
FIG. 8B is a flow chart that describes a method for selecting the manual action button rendered in FIG. 8A, and how the IM responds to the button press by including the action associated with the button press in a message, and sending the message to a message destination.

FIG. 8B describes a method for selecting the user-selectable Manual Action Button 324 populated at the completion of FIG. 8A. In step 550, an IRT 172 user accesses the List Incidents screen 650 of the IM user application 39. In step 553, the user selects an incident, and selects manual action button "Notify E-team" 324. Then, in step 554, in response to the selection of the manual action button 324, the knowledge base 122 includes the objects that satisfied the "Notify E-team" manual action condition 44 in a message 40, and sends the message 40 to the message destination 62 configured for the manual action condition 44.

Figure 8C:
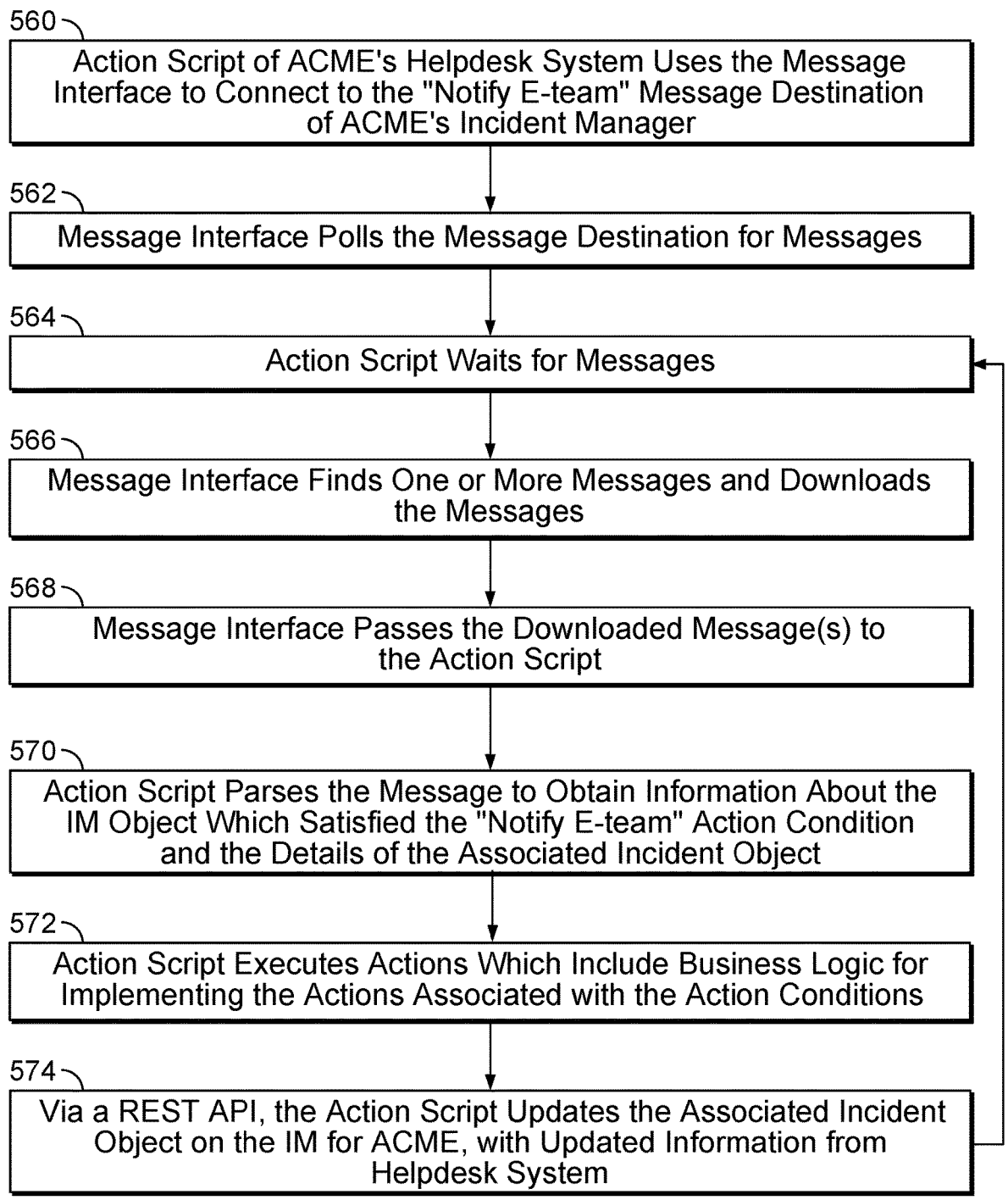
FIG. 8C is a flow chart that describes a method for how a message enabled device in client ACME's enterprise network uses the action response framework of the IM to implement an incident response, where the message enabled device is a Helpdesk System, and the incident response is according to the satisfied manual action condition in FIG. 8B.

FIG. 8C shows a method that describes how action script 42-1 of message enabled device Helpdesk System 98 receives messages 40-1 from a message destination 62-1, the messages 40-1 including objects that satisfy the "Notify E-team" manual action condition defined in FIG. 8B.

In step 560, action script 42-1 of ACME's Helpdesk system 98 uses the Message interface 42-1 to connect to the "Notify E-team message" destination 62-1.

In step 562, message interface 74-1 polls the message destination 62-1 for messages 42-1. In step 564, the action script 42-1 waits for a message 40-1. Then, in step 566, the message interface 74-1 finds one or more messages 40-1 and downloads the messages 40-1. According to step 568, the message interface 74-1 passes the downloaded message(s) to the action script 42-1.

In step 570, action script 42-1 parses the message 40-1 to obtain the information about the IM object which satisfied the "Notify E-team" action condition 44 and the details of the associated Incident object. Then in step 572, the action script 42-1 executes actions 43-1 which include business logic for implementing the actions 43-1 associated with the action conditions 44. The actions 43-1, and therefore the business logic, reference the information concerning the data security incidents extracted from the downloaded messages 40-1. Finally, in step 574, via a REST API 134, the action script 42-1 updates the associated incident object 41 and/or IAs 120 on the IM 102 for ACME, with updated information from Helpdesk system 98. In this way, the message enabled devices can update or annotate objects in the knowledge base 122 such as incident artifacts 120 and notes 121 with device-specific information to improve knowledge and incident response behavior of the IM 102.

Figure 10:
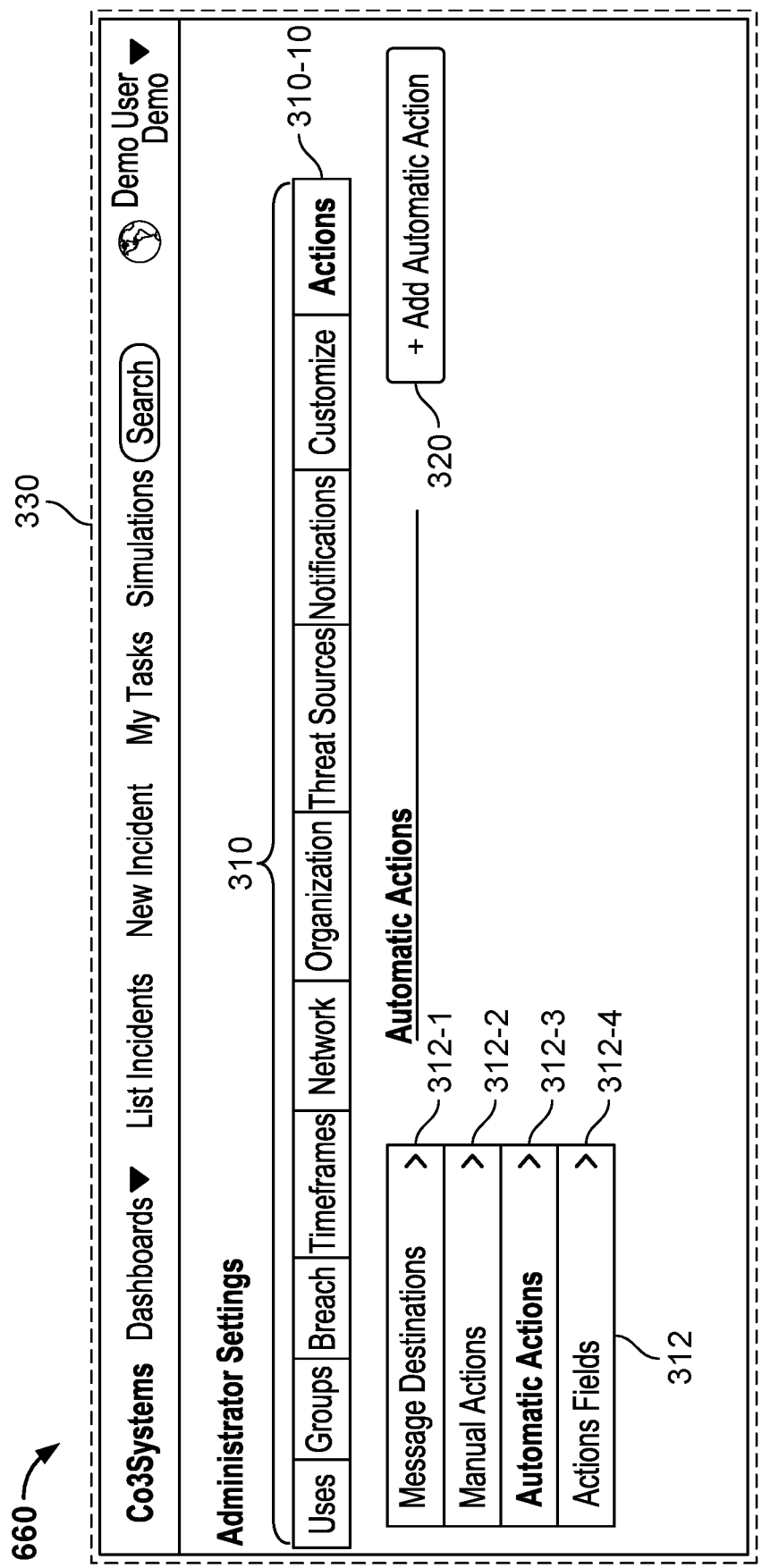
FIG. 10 shows the Automatic Actions Screen of the IM application when no automatic actions are currently configured.

FIG. 10 shows the Automatic Actions Screen 660 of the IM user application 39. Currently, no automatic action conditions 44 are configured. As a result, no automatic action conditions 44 are displayed in the display pane 360 of the Automatic Actions Screen 660.

Figure 11A:
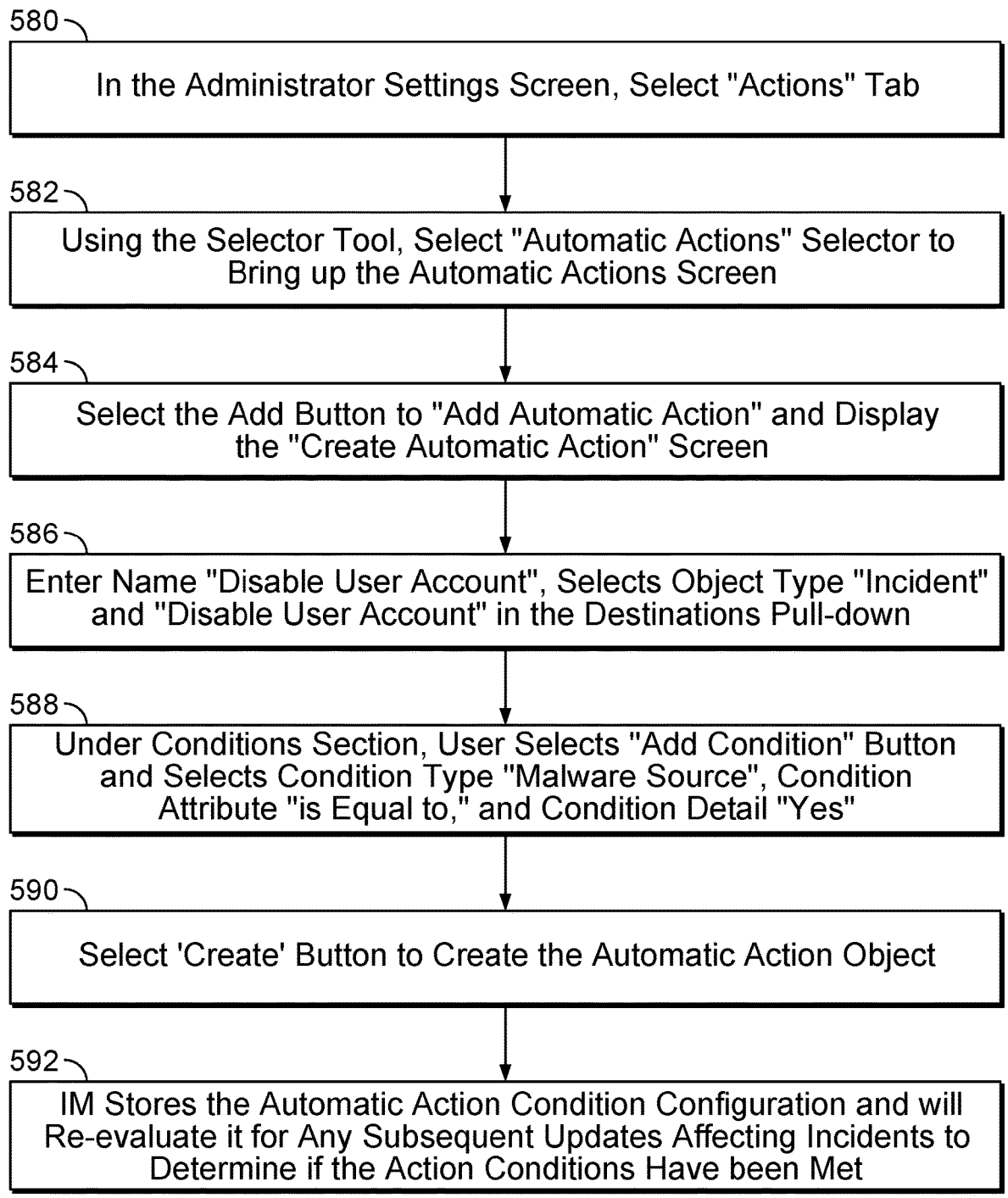
FIG. 11A is a flow chart that describes a method for creating and configuring a first automatic action condition, which is satisfied by information concerning a data security incident involving a malware source address detected on the client's enterprise network.

FIG. 11A is a method for creating and configuring an exemplary first automatic action condition 44, in response to a data security incident involving a compromised user account 60 in user account database 58 for client ACME Company.

In step 580, in the Administrator Settings 610 screen, IRT users 172 select the "Actions" tab 310-10. In step 582, using the selector tool 312, IRT users 172 select the "Automatic Actions" selector 312-3 to bring up the Automatic Actions screen 650, and verify that no actions are currently displayed in the display pane 360.

In step 584, IRT users 172 select the Add Button 320 to "Add Automatic Action" and display the "Create Automatic Action" screen 660.

Figure 12:
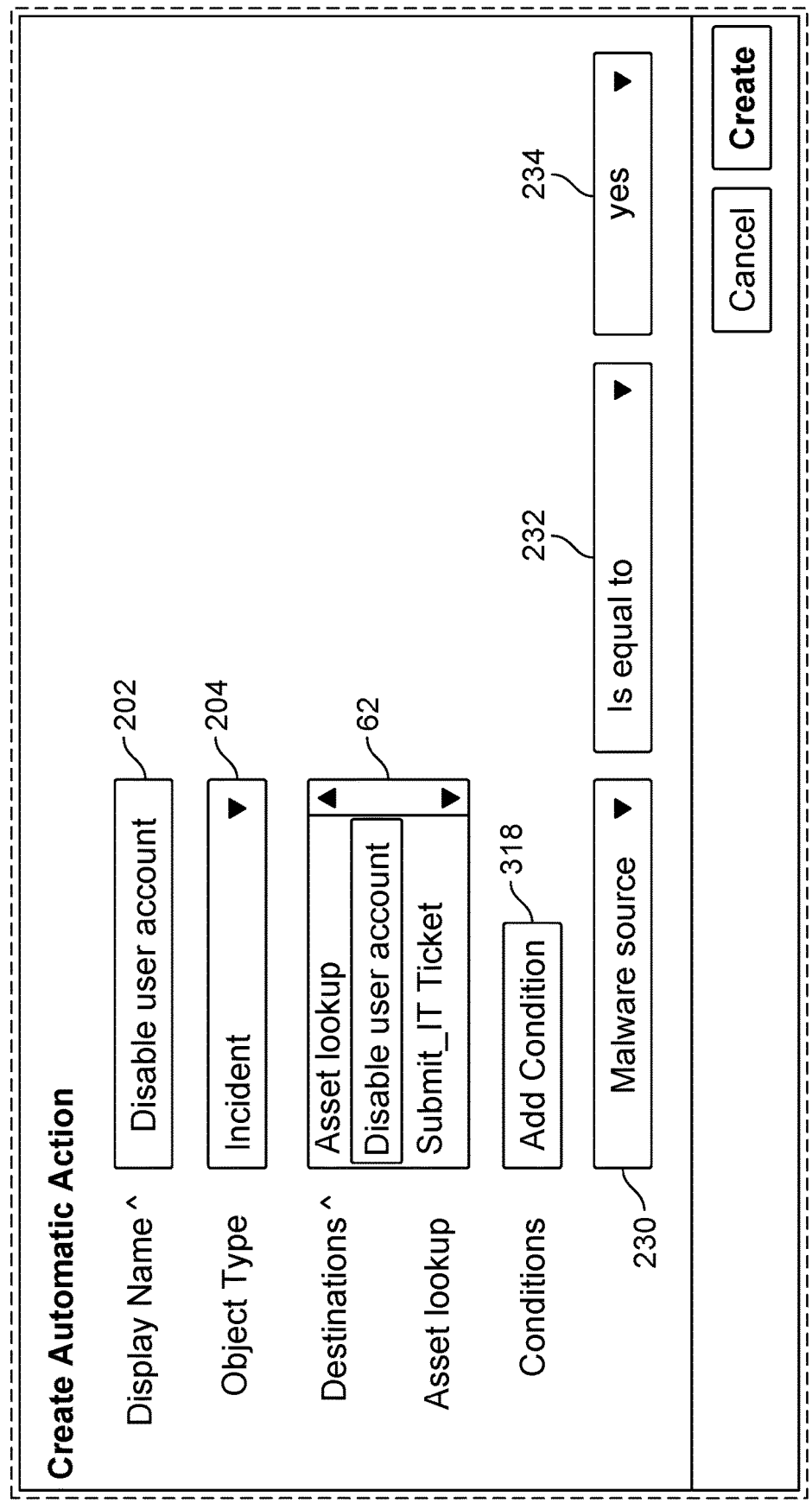
FIG. 12 shows the Create Automatic Actions Screen of the IM user application for configuring the first automatic action condition in FIG. 11A.

FIG. 12 shows the Create Automatic Action Screen 670 of the IM user application 39. In addition to specifying a display name 202, object type 204, and destination 62, users create and define conditions for the automatic action condition 44. Using the condition button 318, users define a condition type 230, condition attribute 232, and condition detail 234.

Returning to FIG. 11A, in step 586, the user enters display name 202 "Disable User Account," selects object type 204 "incident" and "Disable User Account" message destination 62 in the Destinations pull-down. Then, in step 588, under the Conditions section, a user selects "Add Condition" button 318, condition type 230 "Malware Source." condition attribute 232 "is equal to," and selects condition detail 234 "yes."

In step 590, the user selects the 'create' button 362 to create the automatic action condition 44. Finally, in step 592, the IM 102 stores the automatic action condition 44 configuration, and will re-evaluate it for any subsequent updates affecting incidents to determine if the action conditions 44 have been met.

Figure 11B:
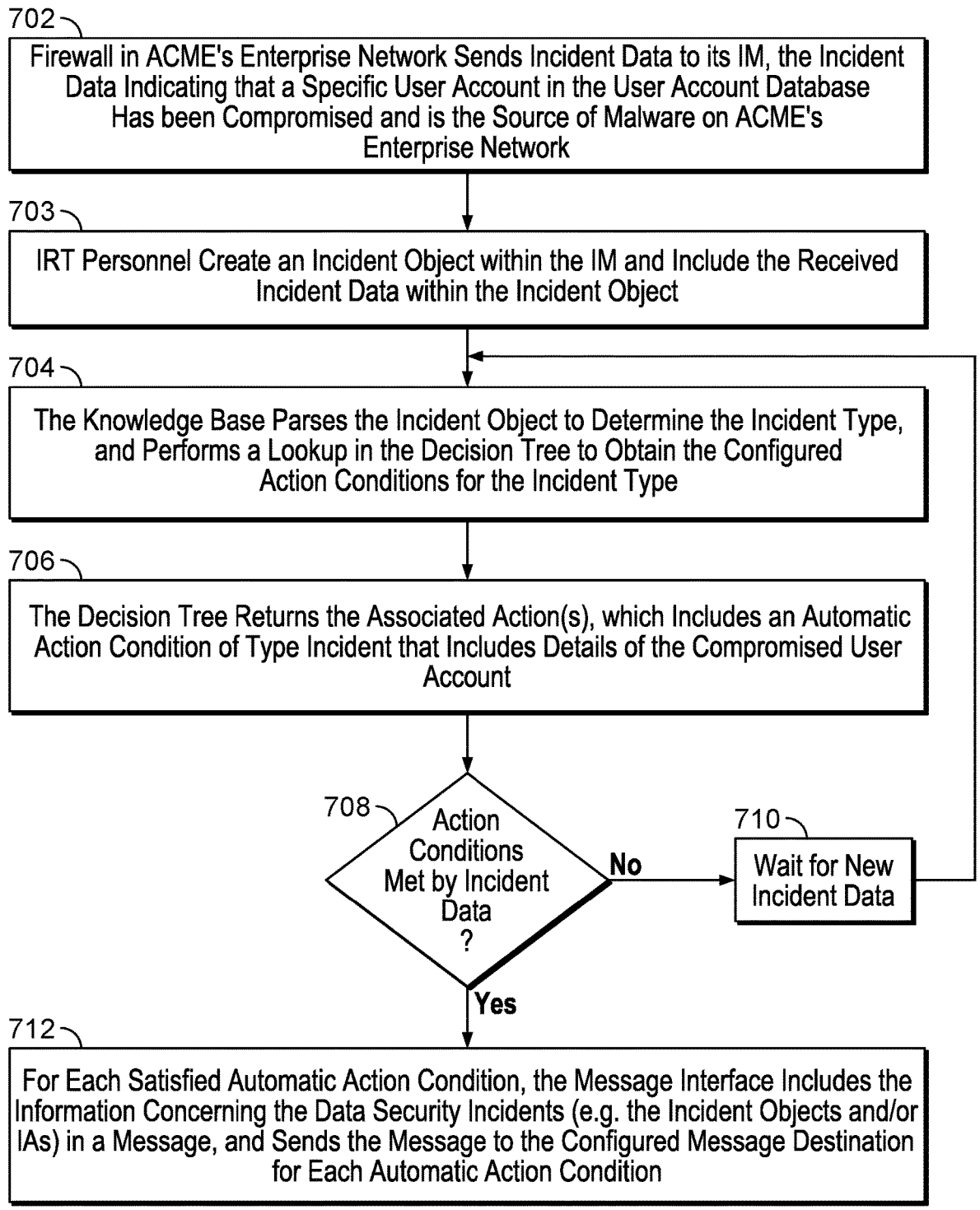
FIG. 11B is a flow chart that describes an exemplary data security incident, the details of which are stored in incident objects and/or incident artifacts, where the details of the incident satisfy the conditions of the first automatic action condition of FIG. 11A, and where in response to the satisfied action condition, the IM includes the incident details (e.g. the incident objects and/or incident artifacts) in a message to a message destination.

FIG. 11B shows a method that describes an exemplary data incident, the data of which meets the conditions of the automatic action condition configured in FIG. 11A. The method also describes how the IM 102 sends information about the IM object associated with the satisfied automatic action condition 44 in a message 40 to a message destination 62.

In step 702, firewall 36 in ACME's enterprise network 130 sends incident data 20 to IM 102, the incident data 20 indicating that a specific user account 60 in the user account database 58 has been compromised and is the source of malware on ACME's enterprise network 130. In step 703, IRT personnel 172 create an incident object 41 within the IM and include the received incident data 20 within the incident object 41.

In step 704, the knowledge base 122 parses the incident object 41 to determine the incident type, and performs a lookup in the decision tree 18 to obtain the configured automatic action conditions 44 for the incident type.

According to step 706, the decision tree 18 returns the associated action(s), which includes an automatic action condition 44 of type incident that includes details of the compromised user account 60. Then, in step 708, the decision tree 18 determines if any action conditions 44 have been met by the incident data 20. If this resolves to true, the method transitions to step 712. Otherwise, the method transitions to step 710 to wait for new incident data 20, which in turn transitions to the beginning of step 704.

It is important to note that the user account database 58 is not a message enabled device. Instead, the configuration server 103 includes action script 42-4. Action script 42-4 includes action 43-4, the execution of which carries out the incident response to the data security incident on the user account database 58.

In step 712, for each satisfied automatic action condition 44, the message interface 74 includes the information about the data security incidents (e.g. the incident object(s) 41 and/or IAs 120) which caused the automatic action condition 44 to be satisfied in a message 40, and sends the message 40 to the configured message destination 62 for each automatic action condition 44. In the example, message interface 74-3 of the configuration server 103 includes action script 42-4 for implementing responses to security incidents on the user account database 58. The incident data 20 for the incident which caused the automatic action condition to be satisfied is included within message 40-4 and sent to message destination 62-4.

It can also be appreciated that automatic action conditions 44 can be configured to trigger or "fire" not only in response to receiving incident data 20 for incidents, but also in response to detecting state changes in metadata within the knowledge base 122 associated with incidents. The metadata includes IAs 120 and notes 121, in examples. An example of an automatic action condition 44 configured in this way accompanies the description of FIG. 13B, included herein below.

Figure 11C:
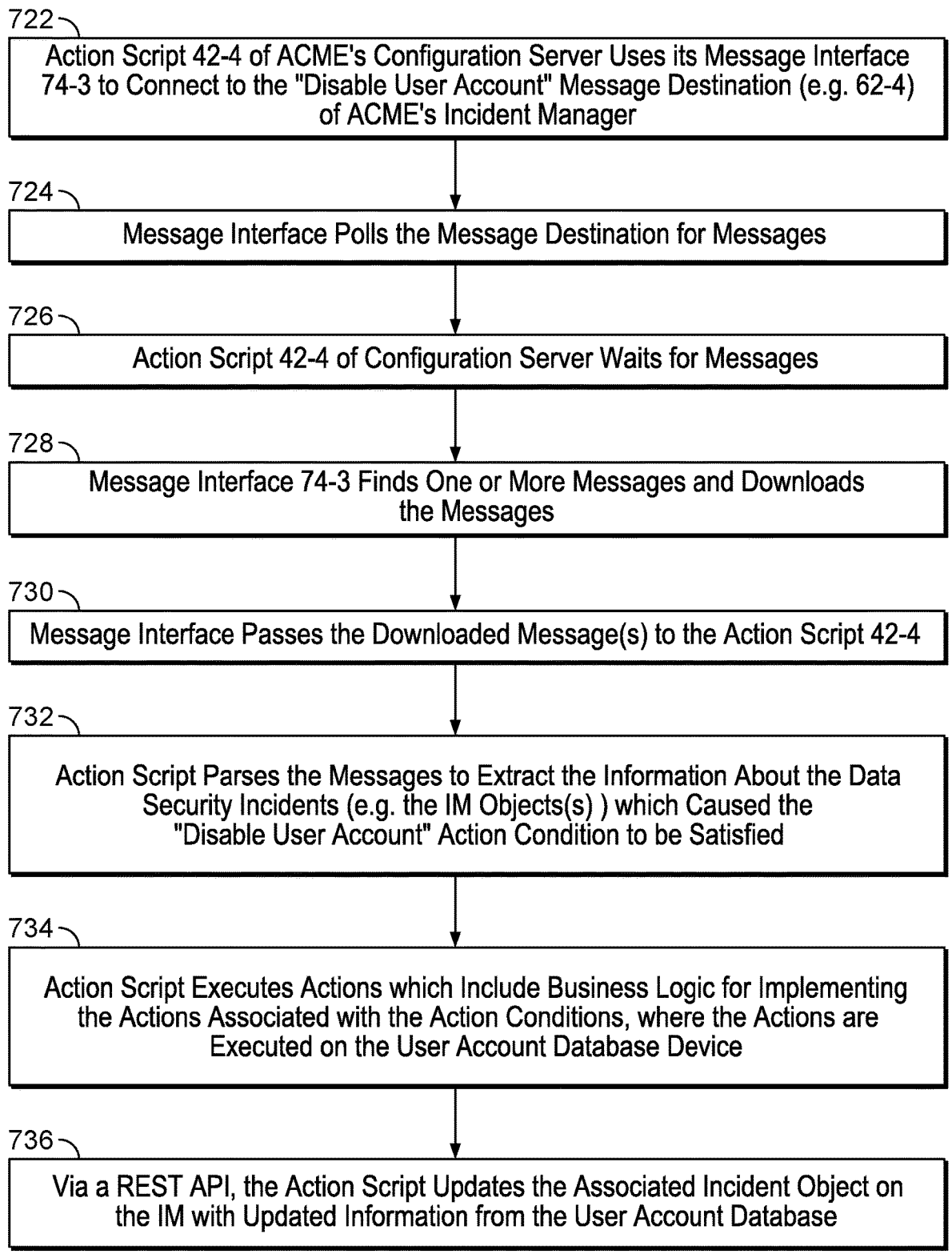
FIG. 11C is a flow chart that describes a method for a user account database message enabled device in client ACME's enterprise network, where the user account database uses the IM to implement an incident response, in accordance with the satisfied first automatic action condition of FIG. 11B.

FIG. 11C shows a method that describes how action script 42-4 of the configuration server 103 receives messages 40-4 from message destination 62-4, the messages 40-3 including information about the data security incidents (e.g. IM object(s)) which caused the action conditions 44 to be satisfied. The action script 42-4 then executes action 43-4 upon the user account database 58 to implement the incident response.

In step 722, action script 42-4 of configuration server 103 uses its Message interface 74-3 to connect to the "Disable User Account" message destination 62-4 of ACME's Incident Manager 102. In step 724, message interface 74-3 polls the message destination 62-4 for messages 404, and action script 42-4 waits for messages 40-4 in step 726.

In step 728, message interface 74-3 finds one or more messages 40-4 and downloads the messages 40-4. In step 730, the message interface 74-3 passes the downloaded message(s) 40-4 to action script 42-4.

According to step 732, the action script 74-4 parses the messages 40-4 to extract the information about the data security incidents (e.g. IM object(s)) which caused the "Disable User Account" action conditions 44 to be satisfied. In step 734, the action script 42-4 executes actions 42-4 which include business logic to implement the actions 43-4 associated with the action conditions 44. The actions 43-4, and therefore the business logic, reference the information concerning the data security incidents extracted from the downloaded messages 40-4. The actions 42-4 are executed on the user account database 58. As in the example for the manual action condition 44 described in FIG. 8C, other action scripts 42 of the configuration server 103 can implement responses to incidents on other devices in the enterprise network 130. Then, the action script 42-4 can send informational updates from the other message enabled devices via the REST API 134 of the IM 102, in one example.

Finally, in step 736, using the REST API 134, the action script 42-4 updates the associated incident object on the IM 102 with updated information from the user account database 60. In other examples, the action script 74-1 can send updates to the objects stored on the IM 102 via other APIs 134 of the IM 102.

Figure 13A:
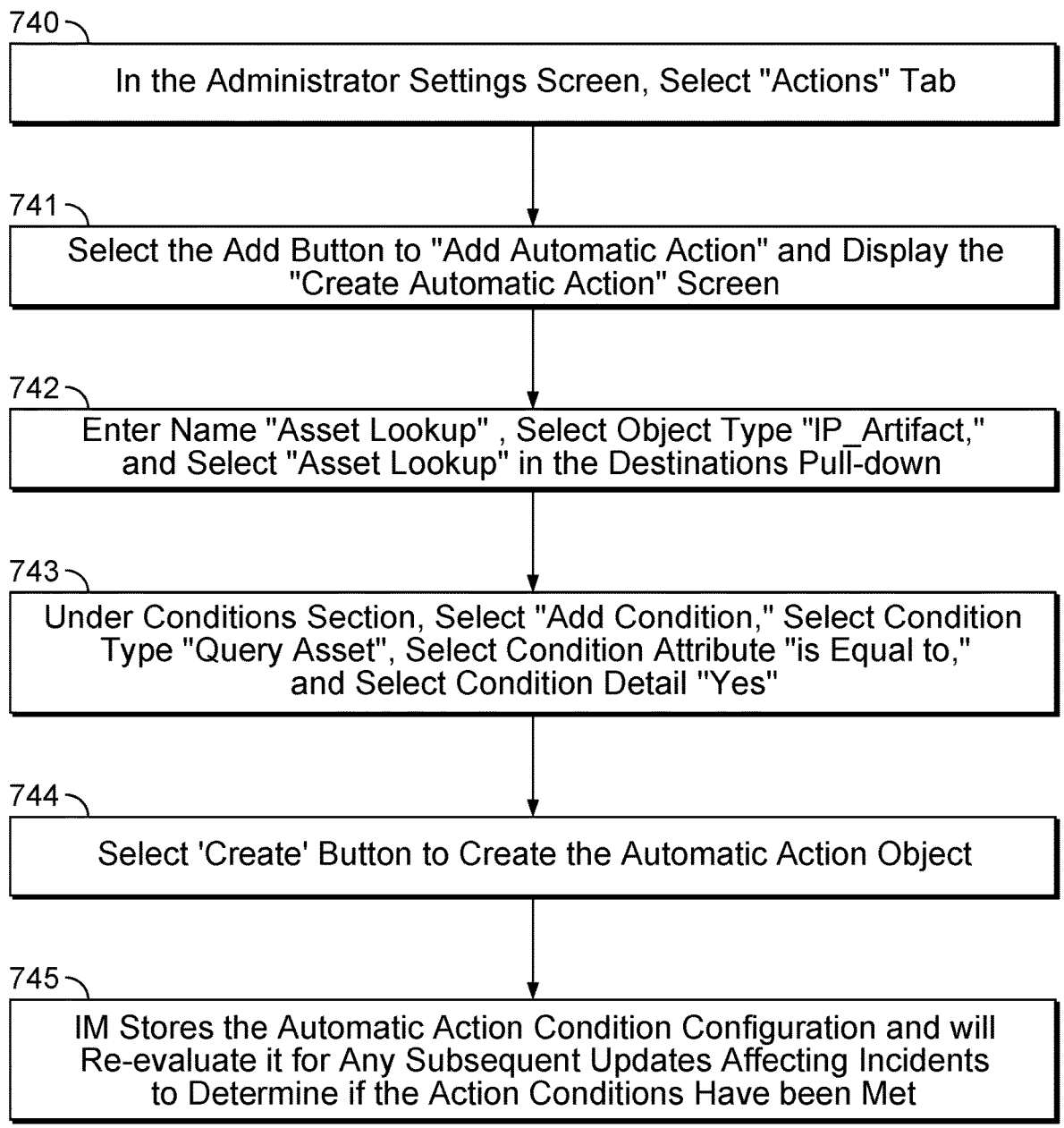
FIG. 13A is a flow chart that describes a method for creating and configuring a second automatic action condition, which is satisfied by the creation of an incident artifact for an incident.

FIG. 13A is a method for creating and configuring an exemplary second automatic action condition 44, in response to an incident involving a compromised asset 59 such as a spoofed source IP address in an asset database 64 for client ACME.

In step 740, in the Administrator Settings 610 screen, IRT personnel 172 select the "Actions" tab 310-10. In step 741, IRT personnel 172 select the Add Button 320 to "Add Automatic Action" and display the "Create Automatic Action" screen 660.

According to step 742, the user enters display name 202 "Asset Lookup," selects object type 204 "IP_Artifact" and "Asset Lookup" message destination 62 in the Destinations pull-down.

Then, in step 743, under the Conditions section, a user selects "Add Condition" button 318, condition type 230 "Malware Source," condition attribute 232 "is equal to," and selects condition detail 234 "yes."

Figure 14A:
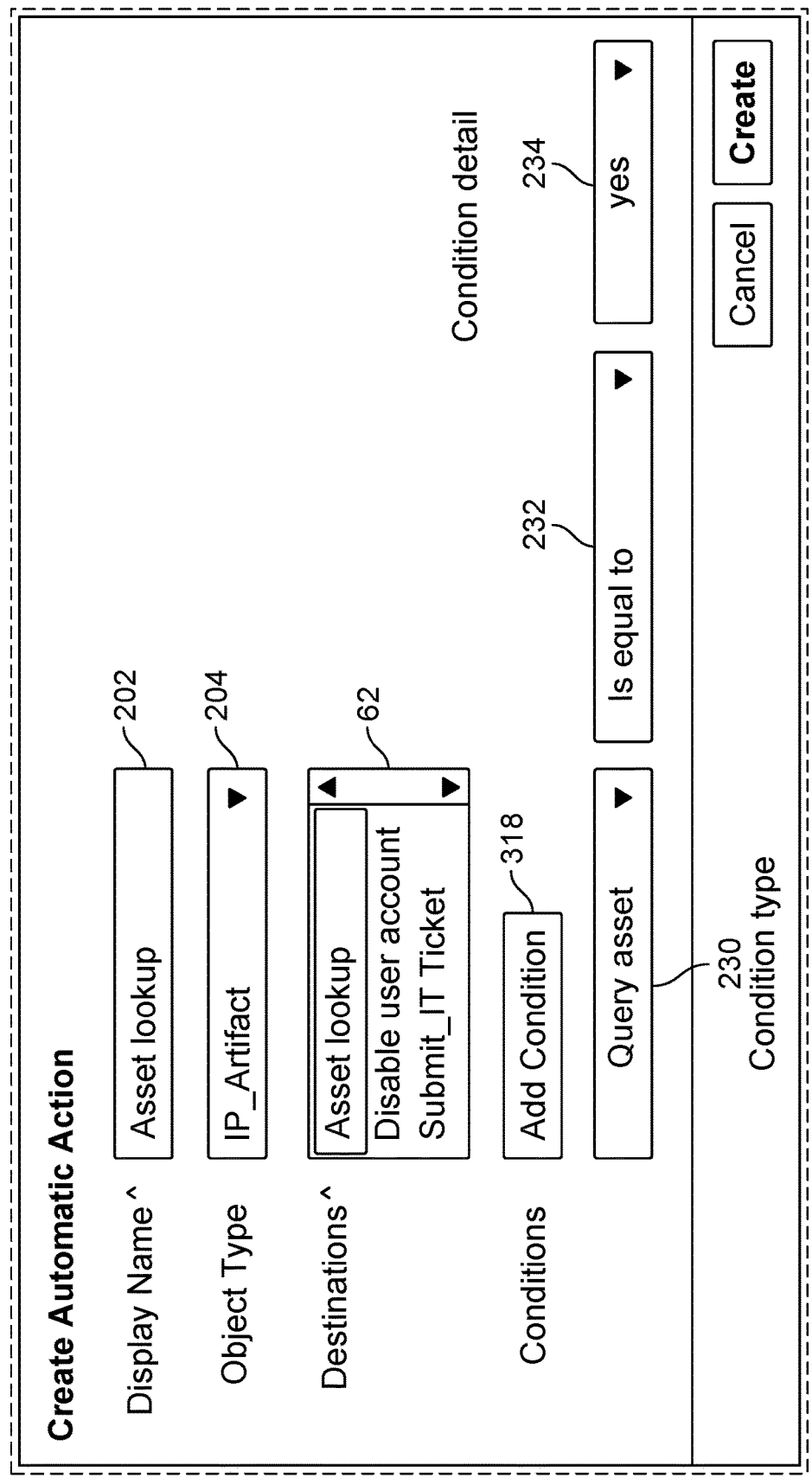
FIG. 14A shows the Create Automatic Action Screen of the IM user application.

FIG. 14A shows the Create Automatic Action Screen 670 of the IM user application 39 with the information specified hitherto in FIG. 13A.

Returning to FIG. 13A, in step 744, the user selects the 'create' button 362 to create the automatic action condition 44. Finally, in step 745, the IM 102 stores the automatic action condition 44 configuration, and will re-evaluate it for any subsequent updates affecting incidents to determine if the action conditions 44 have been met.

Figure 13B:
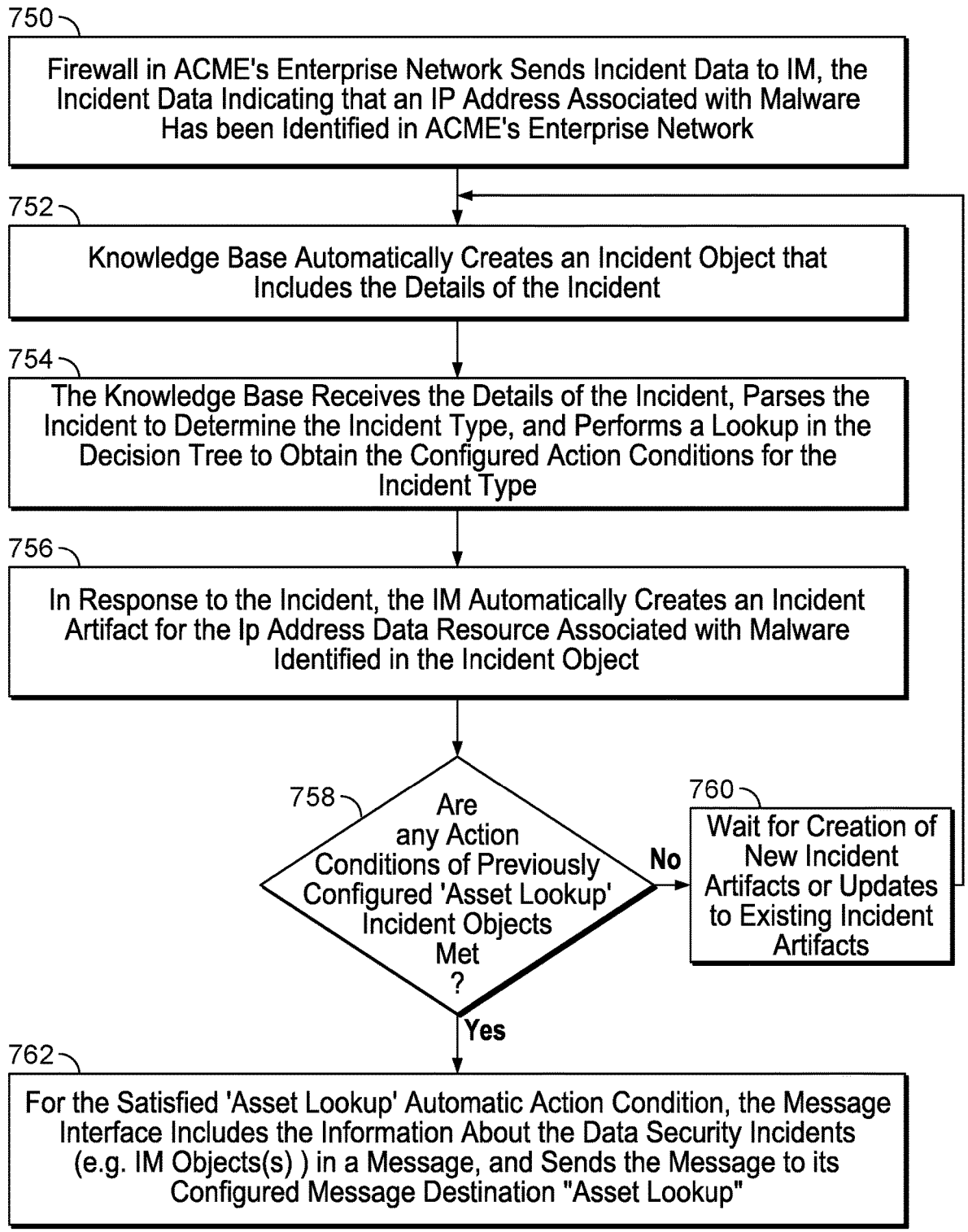
FIG. 13B is a flow chart that that describes another exemplary data security incident, the details of which are stored in incident objects and/or incident artifacts, where the details of the incident satisfy the conditions of the second automatic action condition of FIG. 13A, and where in response to the satisfied automatic action condition, the IM includes the incident details (e.g. the incident objects and/or incident artifacts) in a message to a message destination.

FIG. 13B shows a method that describes an exemplary state change in metadata associated with an incident, the state change of which meets the conditions of the automatic action condition configured in FIG. 13A. The method also describes how the IM 102 sends information about the data security incidents (e.g. IM object(s)) which satisfied automatic action condition 44 in a message 40-2 to a message destination 62-2.

In step 750, firewall 36 in ACME's enterprise network 130 sends incident data 20 to IM 102, the incident data 20 indicating that an IP address associated with malware has been identified in ACME's enterprise network 130. In step 754, the knowledge base 122 automatically creates an incident object 41 that includes the incident data. Note that IRT personnel 172 can alternative manually create the incident object 41 that includes the incident data 20, as previously described in the flow charts of FIGS. 8A and 11B included herein above.

In step 752, the knowledge base 122 receives the details of the incident, parses the incident to determine the incident type, and performs a lookup in the decision tree 18 to obtain the configured automatic action conditions 44 for the incident type.

According to step 754, the knowledge base 122 creates an Incident object 41 that includes the details of the incident. Then, in response to the incident, using the IM application, the IM automatically creates an IA 120 for the IP address data resource associated with malware identified in the incident object 41 in step 756.

In step 758, the decision tree 18 determines if any action conditions 44 of previously configured "Asset Lookup" incident objects have been met. In one example, the action conditions 44 are satisfied when users change the state of incident objects 41 to include new information about incidents. If step 758 resolves to true, the method transitions to step 762. Otherwise, the method transitions to step 760 to wait for creation of new Incident Artifacts or updates to existing incident artifacts. This is because either the creation of new incident objects 41 or updates to existing incident objects 41 in the knowledge base 122 may satisfy the action conditions 44 for the automatic action condition 44 configured in FIG. 13A.

In step 762, for the satisfied "Asset Lookup" automatic action condition 44, the message interface 74-2 includes the information about the data security incidents (e.g. IM object(s)) causing the action condition to be satisfied in a message 40-2, and sends the message 40-2 to the configured message destination 62-2 "Asset Lookup" for the automatic action condition 44.

Figure 13C:
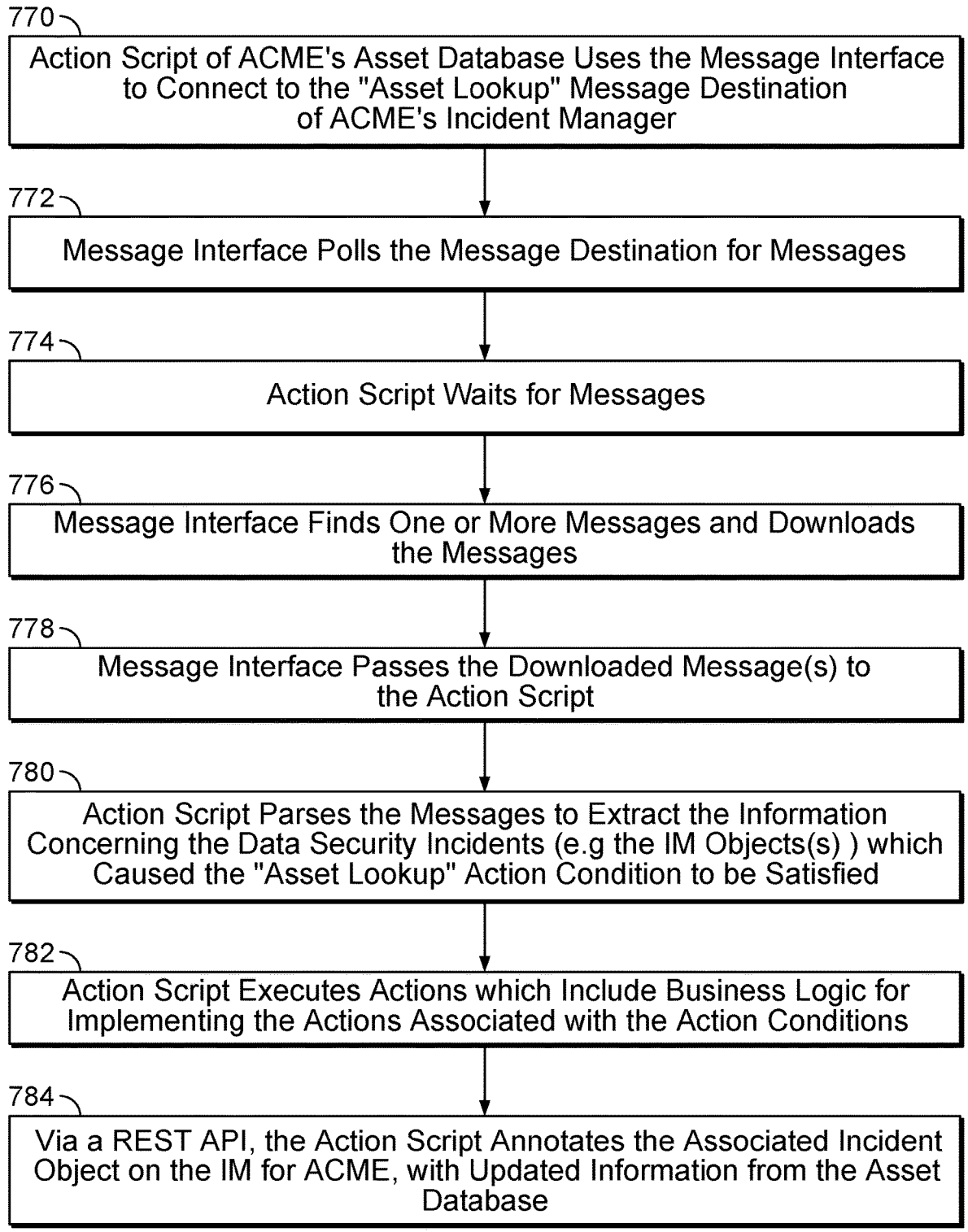
FIG. 13C is a flow chart that describes a method for an asset database message enabled device in client ACME's enterprise network, where the asset database implements an incident response in accordance with the satisfied second automatic action condition of FIG. 13B.

FIG. 13C shows a method that describes how action script 42-2 of the asset database 64 receives messages 40-2 from a message destination 62-2, the messages 40-2 including information about the data security incidents (e.g. associated IM object(s)) for the action script 42-2 to reference during execution of its incident response actions.

In step 770, action script 42-2 of ACME's Asset Database 64 uses the Message interface to connect to the "Asset Lookup" message destination 62-2 of ACME's Incident Manager 102. In step 772, message interface 74-2 polls the message destination 62-2 for messages 40-3, and action script 42-2 waits for messages 40-2 in step 774.

In step 776, message interface 74-2 finds one or more messages 40-2 and downloads the messages 40-2. In step 778, the message interface 74-2 passes the downloaded message(s) 40-2 to the action script 42-2.

According to step 780, the action script 74-2 parses the messages 40-2 to extract the information about the data security incidents (e.g. IM object(s)) which caused the "Asset Lookup" action conditions 44 to be satisfied.

In step 782, the action script 42-2 executes actions 43-2 associated with the action conditions 44 to implement the actions associated with the action conditions 44. The actions 43-2, and therefore the business logic, reference the information concerning the data security incidents extracted from the downloaded messages 40-2.

Finally, in step 784, via a REST API 134, the action script 42-2 annotates the associated incident object 41 on the IM 102-1 for client ACME Company. In the example, action script 42-2 annotates an incident object 41, with updated information from the asset database 64.

Figure 14B:
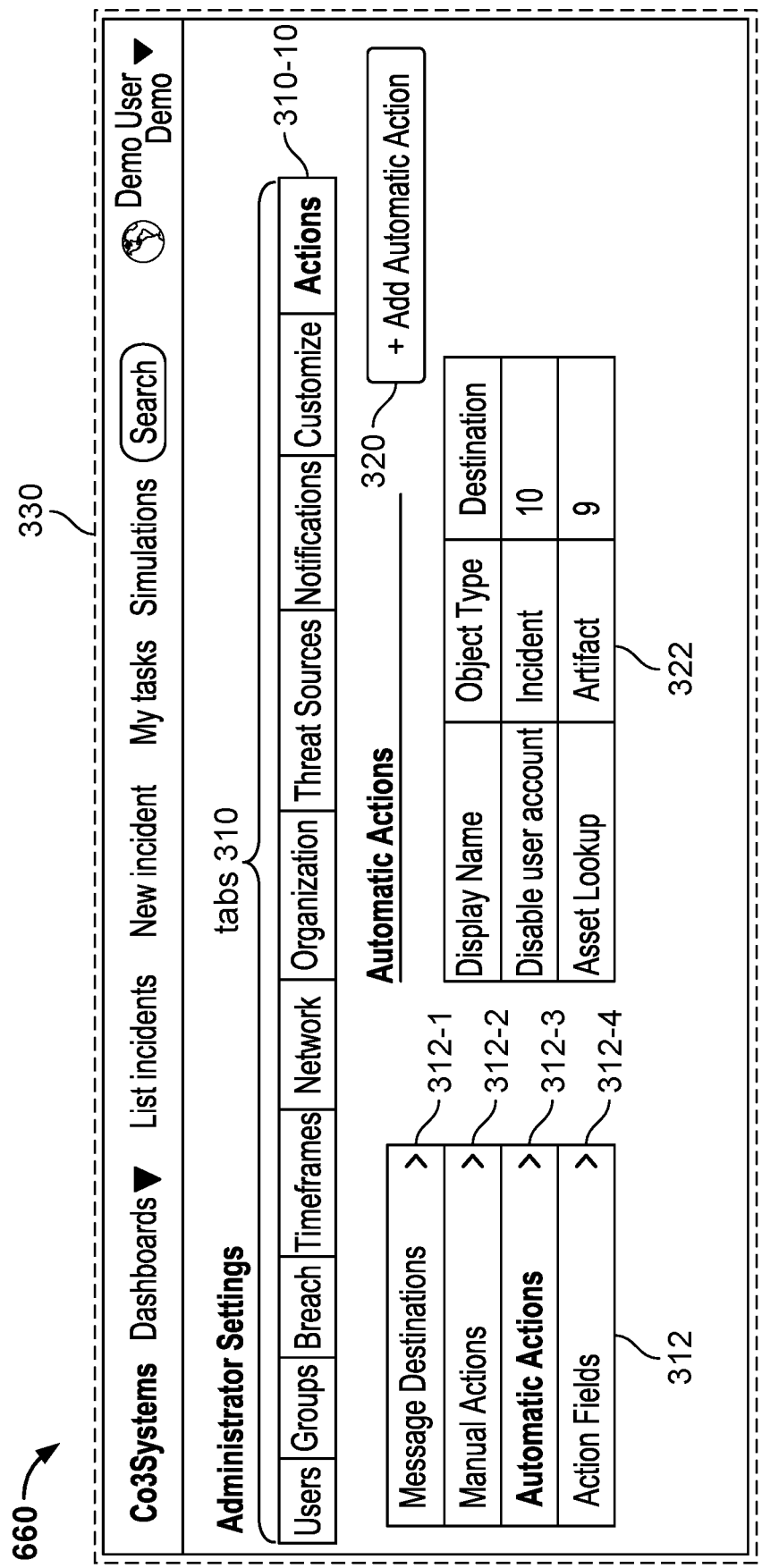
FIG. 14B shows the Automatic Actions screen of the IM user application, and lists the two automatic action conditions configured in FIGS. 11A and 13A.

FIG. 14B shows the automatic actions screen 660, and displays the two automatic action conditions 44 configured in FIGS. 11A and 13A.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A system comprising:
   a graphical user interface configured to:
     receive an indication to add an automatic action, wherein the automatic action comprises one or more conditions for satisfying the automatic action, and wherein a condition of the one or more conditions includes a message destination; and
   a processor configured to:
     receive an indication of an incident, wherein the indication comprises an incident object;
     parse the incident object to determine an incident type associated with the incident;
     perform a lookup in a decision tree to determine whether the automatic action is configured for the incident type, wherein the lookup retrieves the message destination for the incident type via the decision tree;
     in response to a determination that the automatic action is configured for the incident type, determine whether the condition of the one or more conditions is satisfied by the incident object; and
     in response to the condition being satisfied, send a message to the message destination, wherein the message comprises the incident object.

2. The system of claim 1, wherein the graphical user interface is further configured to display a button for indicating to add an automatic action.

3. The system of claim 1, wherein the graphical user interface is further configured to display a graphical user interface for creating an automatic action.

4. The system of claim 3, wherein the graphical user interface for creating the automatic action enables an indication of an associated incident type.

5. The system of claim 3, wherein the graphical user interface includes a create button.

6. The system of claim 1, wherein the automatic action comprises an instruction to quarantine a device.

7. The system of claim 6, wherein quarantining the device comprises segmenting network traffic.

8. The system of claim 1, wherein the automatic action comprises an instruction to lock a user account.

9. The system of claim 8, wherein the lock of the user account is associated with detection of malware.

10. The system of claim 1, wherein the automatic action comprises an instruction to block messages.

11. The system of claim 10, wherein the blocking of messages occurs associated with an IP address associated with malware.

12. The system of claim 1, wherein the automatic action comprises an instruction to close ports on a firewall.

13. The system of claim 12, wherein closing the ports on the firewall is in response to an attach incident.

14. The system of claim 12, wherein closing the ports on the firewall is in response to detection of a spoofed IP address.

15. The system of claim 1, wherein the automatic action comprises updating at least one of one or more control lists or one or more account databases to blacklist one or more user identifications.

16. The system of claim 15, wherein blacklisting the one or more user identifications is in response to detection of a phishing event associated with the one or more user identifications.

17. The system of claim 1, wherein the message destination retrieved by the lookup via the decision tree identifies a machine-readable endpoint within an enterprise network configured to receive and process the message without human intervention.

18. The system of claim 17, wherein the machine-readable endpoint comprises a message queue, and sending the message to the message destination is associated with enqueuing the message in the message queue.

19. A method comprising:
receiving, using a graphical user interface, an indication to add an automatic action, wherein the automatic action comprises one or more conditions for satisfying the automatic action, and wherein a condition of the one or more conditions includes a message destination;
receiving an indication of an incident, wherein the indication comprises an incident object;
parsing, using a processor, the incident object to determine an incident type associated with the incident;
performing a lookup in a decision tree to determine whether the automatic action is configured for the incident type, wherein the lookup retrieves the message destination for the incident type via the decision tree;
in response to a determination that the automatic action is configured for the incident type, determining whether the condition of the one or more conditions is satisfied by the incident object; and
in response to the condition being satisfied, sending a message to the message destination, wherein the message comprises the incident object.

20. A computer program product embodied in a non-transitory computer readable medium and comprising computer instructions for:
receiving, using a graphical user interface, an indication to add an automatic action, wherein the automatic action comprises one or more conditions for satisfying the automatic action, and wherein a condition of the one or more conditions includes a message destination;
receiving an indication of an incident, wherein the indication comprises an incident object;
parsing, using a processor, the incident object to determine an incident type associated with the incident;
performing a lookup in a decision tree to determine whether the automatic action is configured for the incident type, wherein the lookup retrieves the message destination for the incident type via the decision tree;
in response to a determination that the automatic action is configured for the incident type, determining whether the condition of the one or more conditions is satisfied by the incident object; and
in response to the condition being satisfied, sending a message to the message destination, wherein the message comprises the incident object.

* * * * *